(12) United States Patent
Ikeda et al.

(10) Patent No.: US 11,830,174 B2
(45) Date of Patent: Nov. 28, 2023

(54) DEFECT INSPECTING DEVICE, DEFECT INSPECTING METHOD, AND STORAGE MEDIUM

(71) Applicant: OMRON Corporation, Kyoto (JP)

(72) Inventors: Yasuyuki Ikeda, Moriyama (JP); Masashi Kurita, Kizugawa (JP)

(73) Assignee: OMRON Corporation, Kyoto (JP)

( * ) Notice: Subject to any disclaimer, the term of this patent is extended or adjusted under 35 U.S.C. 154(b) by 472 days.

(21) Appl. No.: 17/270,426

(22) PCT Filed: Nov. 13, 2019

(86) PCT No.: PCT/JP2019/044604
§ 371 (c)(1),
(2) Date: Feb. 22, 2021

(87) PCT Pub. No.: WO2020/137222
PCT Pub. Date: Jul. 2, 2020

(65) Prior Publication Data
US 2021/0183052 A1  Jun. 17, 2021

(30) Foreign Application Priority Data
Dec. 28, 2018 (JP) ................. 2018-247105

(51) Int. Cl.
*G06T 7/136* (2017.01)
*G06T 7/00* (2017.01)
(Continued)

(52) U.S. Cl.
CPC .......... *G06T 7/0004* (2013.01); *G06N 3/04* (2013.01); *G06N 3/08* (2013.01); *G06T 7/11* (2017.01);
(Continued)

(58) Field of Classification Search
CPC ......... G06T 7/0004; G06T 7/11; G06T 7/136; G06T 7/62; G06T 7/90;
(Continued)

(56) References Cited

U.S. PATENT DOCUMENTS 11,301,978 B2 * 4/2022 Ikeda ................ G06T 7/0004
2006/0078191 A1 * 4/2006 Matsumura ........ G01N 21/8851
382/149

(Continued)

FOREIGN PATENT DOCUMENTS

CN 106875381 6/2017
EP 3540688 9/2019
(Continued)

OTHER PUBLICATIONS

"International Search Report (Form PCT/ISA/210) of PCT/JP2019/044604", dated Feb. 18, 2020, with English translation thereof, pp. 1-6.
(Continued)

*Primary Examiner* — Jonathan M Hansen
(74) *Attorney, Agent, or Firm* — JCIPRNET

(57) ABSTRACT

A defect inspecting device including an acquisition unit, an image generating unit, an inspection unit, and a setting unit. The image generating unit generates one or more feature extraction images by applying to an inspection image a learned classifier. The inspection unit identifies a region corresponding to a defect based on one or more determination parameters and a binarized image generated based on the feature extraction image. The setting unit provisionally sets the determination parameters on premise of a post-adjustment from a user when a number of image data for learning corresponding to the features is less than a threshold value in a case where the region corresponding to the defect is identified based on the pre-learned features, and
(Continued)

sets the determination parameters according to designation from the user in a case where the region corresponding to the defect is identified based on a feature other than the pre-learned features.

15 Claims, 18 Drawing Sheets

(51) Int. Cl.
*G06T 7/62* (2017.01)
*G06T 7/11* (2017.01)
*G06T 7/90* (2017.01)
*G06N 3/04* (2023.01)
*G06N 3/08* (2023.01)

(52) U.S. Cl.
CPC ............... *G06T 7/136* (2017.01); *G06T 7/62* (2017.01); *G06T 7/90* (2017.01); *G06T 2207/20081* (2013.01); *G06T 2207/20084* (2013.01); *G06T 2207/30164* (2013.01)

(58) Field of Classification Search
CPC . G06T 2207/20081; G06T 2207/20084; G06T 2207/30164; G06N 3/04; G06N 3/08; G06N 3/045; G01N 21/88
See application file for complete search history.

(56) References Cited

U.S. PATENT DOCUMENTS

| | | | | |
|---|---|---|---|---|
| 2011/0019245 A1* | 1/2011 | Adachi | .............. | H04N 1/00474 |
| | | | | 358/448 |
| 2013/0077850 A1* | 3/2013 | Hirai | ..................... | G06T 7/0004 |
| | | | | 382/149 |
| 2013/0294680 A1* | 11/2013 | Harada | ..................... | G06T 7/11 |
| | | | | 382/149 |
| 2017/0220836 A1 | 8/2017 | Phillips et al. | | |

FOREIGN PATENT DOCUMENTS

| | | |
|---|---|---|
| JP | H0869533 | 3/1996 |
| JP | H09147056 | 6/1997 |
| JP | 2000230909 | 8/2000 |
| JP | 2004334683 | 11/2004 |
| JP | 2005025503 | 1/2005 |
| JP | 2007017264 | 1/2007 |
| JP | 2007200246 | 8/2007 |
| JP | 2013167596 | 8/2013 |
| JP | 2017049974 | 3/2017 |
| JP | 2018116391 | 7/2018 |
| JP | 2018190282 | 11/2018 |
| JP | 2018190329 | 11/2018 |
| WO | 2012011579 | 1/2012 |

OTHER PUBLICATIONS

"Written Opinion of the International Searching Authority (Form PCT/ISA/237) of PCT/ JP2019/044604", dated Feb. 18, 2020, with English translation thereof, pp. 1-8.

Ruoxu Ren et al., "A Generic Deep-Learning-Based Approach for Automated Surface Inspection," IEEE Transactions on Cybernetics, vol. 48, Feb. 2017, pp. 929-940.

Amar R. Marathe et al., "Confidence metrics improve human-autonomy integration," Proceedings of the 5th ACM/SPEC International Conference on Performance Engineering, Mar. 2014, pp. 240-241.

"Search Report of Europe Counterpart Application", dated Sep. 30, 2022, p. 1-p. 10.

* cited by examiner

| Classification | Learning image | | | Teacher data (label) |
|---|---|---|---|---|
| Background | | | ..... | 0 |
| Black dot | | | ..... | 1 |
| White dot | | | ..... | 2 |
| Black line | | | ..... | 3 |
| White line | | | ..... | 4 |

FIG. 5A

DEFECT INSPECTING DEVICE, DEFECT INSPECTING METHOD, AND STORAGE MEDIUM

CROSS-REFERENCE TO RELATED APPLICATION

This application is a 371 application of the International PCT application serial no. PCT/JP2019/044604, filed on Nov. 13, 2019, which claims the priority benefits of Japan Patent Application No. 2018-247105, filed on Dec. 28, 2018. The entirety of each of the above-mentioned patent applications is hereby incorporated by reference herein and made a part of this specification.

BACKGROUND

Technical Field

The present disclosure relates to a defect inspecting device, a defect inspecting method, and a program for the same capable of performing defect detection processing using a classifier generated by machine learning.

Related Art

In the field of factory automation (FA), automatic control using image measurement processing has been widely put into practical use. For example, a step of imaging an inspection target such as a workpiece and inspecting the quality of the workpiece based on a feature amount extracted from a captured image has been realized.

For example, Patent Literature 1 discloses a device for determining the presence or absence of a defect in an inspection target based on an output result of a classifier learned using an image of the inspection target captured under a plurality of imaging conditions as learning data. Specifically, the device described in Patent Literature 1 includes a learning extraction means for extracting a feature amount of an image from at least two images based on images captured under at least two different sets of imaging conditions for an object of which the quality of appearance is known, a selection means for selecting a feature amount for determining the quality of the object from a feature amount straddling the feature amounts extracted from the at least two images by the learning extraction means, and a generation means for generating a classifier for determining the quality of the object based on the feature amount selected by a selection means.

CITATION LIST

Patent Literature

[Patent Literature 1]
Japanese Patent Application Laid-Open No. 2017-49974

SUMMARY

Technical Problem

The conventional classifier as described in Patent Literature 1 learns to detect the presence or absence of a defect based on the feature amount of the image. However, inspection conditions such as a type of workpiece conveyed on a production line and the imaging conditions vary according to the production line, and do not always match conditions at the time of learning. Therefore, when the pre-learned classifier is actually used on a production line, the output result of the classifier may be affected by noise or the like. Noise is an unnecessary feature amount which is mixed into the image due to, for example, light reflection, shadows, or the like. Therefore, in order to determine the presence or absence of a defect based on the output result of the classifier, preferably, determination parameters can be adjusted to separate the noise from the defect. On the other hand, since this adjustment takes time and effort, it may lead to a decrease in productivity.

The present disclosure has been made in view of the above-described circumstances, and provides a technique for appropriately and easily setting determination parameters for determining the presence or absence of a defect in an inspecting device which inspects for the presence or absence of a defect using results output by a pre-learned classifier.

Solution to Problem

The present disclosure employs the following configuration in order to solve the above-described problems.

According to one aspect of the present disclosure, there is provided a defect inspecting device including an acquisition unit configured to acquire an inspection image of an inspection target, an image generating unit configured to generate one or more feature extraction images by applying to the inspection image a learned classifier which has pre-learned by extracting one or more features using image data for learning, an inspection unit configured to identify a region corresponding to a defect based on one or more determination parameters for determining presence or absence of a detection target portion in the inspection target and a binarized image generated based on the feature extraction image, and a setting unit configured to provisionally set the determination parameters on premise of a post-adjustment from a user when a number of image data for learning corresponding to the features is less than a threshold value in a case where the region corresponding to the defect is identified based on the pre-learned features, and to set the determination parameters according to designation from the user in a case where the region corresponding to the defect is identified based on a feature other than the pre-learned features. Accordingly, the determination parameters for determining the presence or absence of defects can be set appropriately and easily, and erroneous determination of defect detection can be curbed.

The setting unit may automatically set the determination parameters when the number of image data for learning corresponding to the features is equal to or greater than the threshold value in the case where the region corresponding to the defect is identified based on the pre-learned features. Accordingly, the determination parameters for determining the presence or absence of defects can be set appropriately and easily.

The setting unit may calculate an image score based on a color density of pixels of a setting image using the setting image which is the binarized image in which the region corresponding to the defect has been identified, and may update the determination parameters so that a difference between the image score inside the region and the image score outside the region becomes relatively large. The feature extraction image refers to an image in which a predetermined feature is extracted from an image input to the defect inspecting device. The binarized image refers to an image which is generated based on the feature extraction image and in which the presence or absence of defects is determined by the inspection unit.

In the above-described configuration, in the defect inspecting device which inspects for the presence or absence of a defect using results output by the pre-learned classifier, it is possible to appropriately and easily set the determination parameters for determining the presence or absence of a defect. Erroneous determination can be reduced by making it possible to appropriately set the determination parameters. In particular, since noise can be reduced, a false detection which recognizes that there is a defect even when there is not a defect is reduced. Furthermore, since the determination parameters can be easily set, man-hours for setting and starting up the defect inspecting device can be reduced.

In the defect inspecting device according to the aspect, the binarized image may be configured of white pixels and black pixels, a density value may be associated with each of the white pixels and the black pixels, and the setting unit may calculate a total value of color density values of a plurality of pixels included in the region as a first image score, may calculate a total value of color density values of a plurality of pixels included outside the region as a second image score, and may update the determination parameters so that a difference between the first image score and the second image score is maximized. According to this aspect, the defect inspecting device can search for appropriate determination parameters by calculating and comparing the image scores.

Further, the determination parameters may include a binarization level for generating the binarized image. Also, the determination parameters may include one or more determination items for determining the binarized image and a determination threshold value set for each of the determination items. According to this aspect, it is possible to appropriately and easily set the threshold value for generating the binarized image to be determined by the inspection unit for the presence or absence of defects. Thus, it is possible to further reduce the erroneous determination.

Further, in the defect inspecting device according to the aspect, the one or more determination items for determining a defect may include at least one of an area, a width and/or a height of a circumscribed rectangle, a perimeter, an aspect ratio, and a circularity of a predetermined region represented by a block of pixels of a same color in the binarized image, and the determination threshold value may include an upper limit value and/or a lower limit value set for each of the determination items. According to this aspect, the defect inspecting device can set the determination threshold value for each of the determination items. Thus, it is possible to set more appropriate determination parameters.

Further, the determination item and the determination threshold value may be determined based on a feature amount of the defect contained in the image data for learning used in learning of the image generating unit or the inspection unit. According to this aspect, the defect inspecting device can set determination conditions corresponding to a distribution of shapes of the defects contained in the learning image included in a learning data set, and can extract the defect having the same shape as a defect contained in the learning data set.

Further, the defect inspecting device according to the aspect may further include a display unit configured to receive designation of the region, the inspection unit may identify a region determined as a defect based on the predetermined determination parameters and may output the identified region together with the inspection image to the display unit, and the setting unit may generate the setting image based on the designation of the region received through the display unit. According to this aspect, the user can make a post-adjustment to the predetermined determination parameters, and can more appropriately and easily adjust a defect inspecting system of the inspection unit. As a result, it is possible to further reduce a load of the user related to adjusting accuracy of the defect detection in the inspection unit.

Further, in the defect inspecting device according to the aspect, in the binarized image, the inspection unit may identify a region determined as a defect in the binarized image based on a determination threshold value set for each of one or more feature amounts for determining the defect, and may prompt the identified region to the user, and the setting unit may receive from the user designation of a region which is determined as a defect by the inspection unit but should not be determined as a defect, and/or a region which is not determined as a defect by the inspection unit but should be determined as a defect, and may update the determination threshold value based on the designation. Furthermore, one or more determination items for determining the defect and the determination threshold value may be determined based on the designation from the user. According to this aspect, the user can make a post-adjustment to the predetermined determination parameters, and can more appropriately and easily adjust a defect inspecting system of the inspection unit.

According to another aspect of the present disclosure, there is provided a defect inspecting method including the following steps executed by a computer: a step of acquiring an inspection image of an inspection target, a step of generating one or more feature extraction images by applying to the inspection image a learned classifier which has pre-learned by extracting one or more features using image data for learning, a step of identifying a region corresponding to a defect based on one or more determination parameters for determining presence or absence of a detection target portion in the inspection target and a binarized image generated based on the feature extraction image, and a step of provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features. Thus, the determination parameters for determining the presence or absence of defects can be set appropriately and easily, and erroneous determination of the defect detection can be curbed.

According to yet another aspect of the present disclosure, there is provided a program which causes a computer to execute the following steps: a step of acquiring an inspection image of an inspection target, a step of generating one or more feature extraction images by applying to the inspection image a learned classifier which has pre-learned by extracting one or more features using image data for learning, a step of identifying a region corresponding to a defect based on one or more determination parameters for determining presence or absence of a detection target portion in the inspection target and a binarized image generated based on the feature extraction image, and a step of provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features. Thus, the determination parameters for determining the presence or absence of defects can be set appropriately and easily, and erroneous determination of the defect detection can be curbed.

Effects of Invention

According to the present disclosure, it is possible to provide a technique for appropriately and easily setting determination parameters for determining the presence or absence of a defect in an inspecting device which inspects for the presence or absence of the defect using results output by a pre-learned classifier.

BRIEF DESCRIPTION OF THE DRAWINGS

FIG. 5A is a view showing an example of a learning data set provided to a CNN engine according to the present embodiment.

DESCRIPTION OF THE EMBODIMENTS

Hereinafter, an embodiment according to one aspect of the present disclosure (hereinafter, also referred to as "the present embodiment") will be described with reference to the drawings. However, the embodiment described below is merely an example of the present disclosure in all respects. Needless to say, various improvements and modifications can be made without departing from the scope of the present disclosure. That is, in carrying out the present disclosure, a specific configuration according to the embodiment may be appropriately adopted. Data appearing in the present embodiment is described in natural language, but more specifically, it may be specified in a pseudo language, commands, parameters, a machine language, or the like which can be recognized by a computer.

§ 1 Application Example

Figure 1:
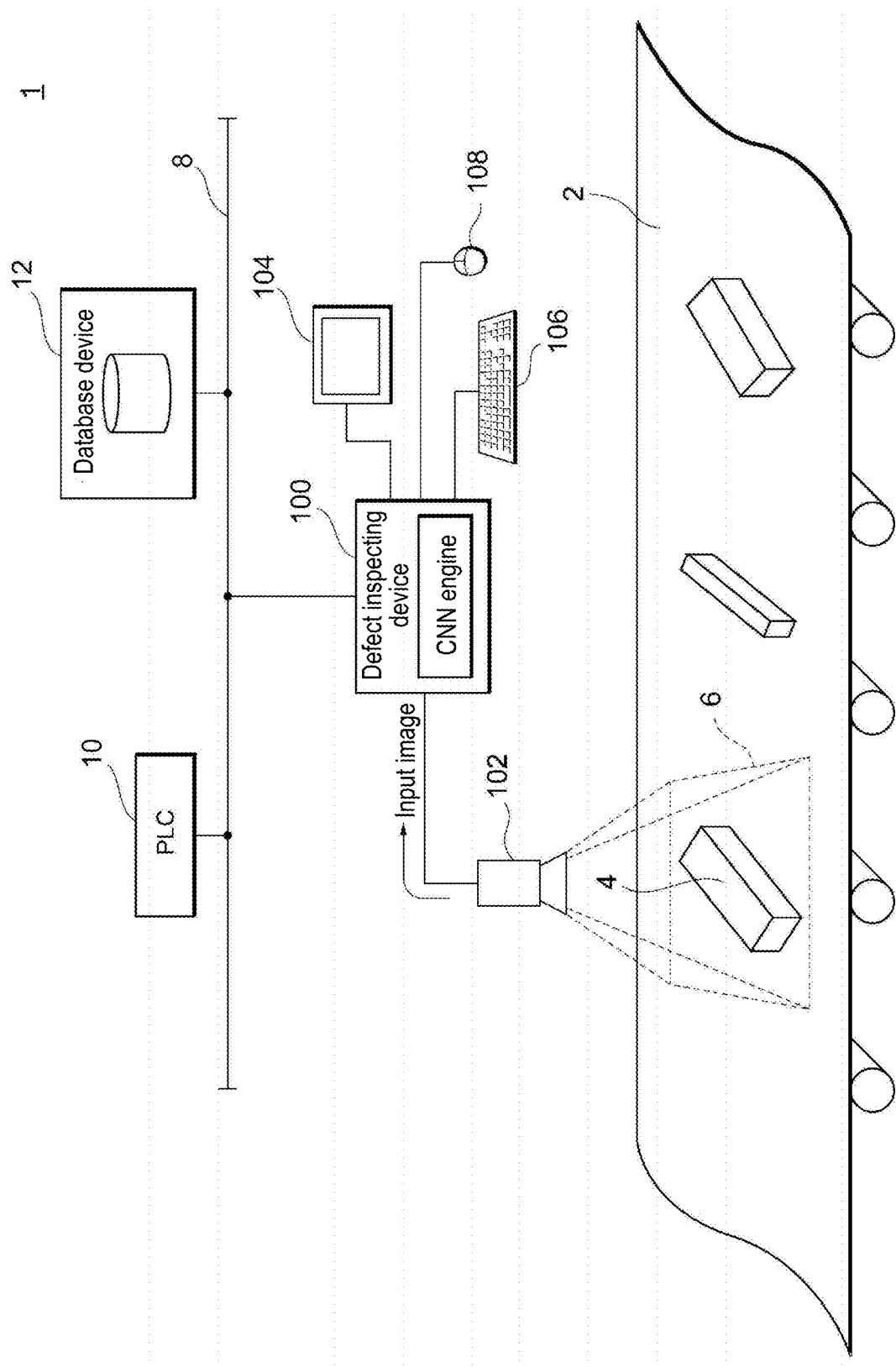
FIG. 1 is a schematic view showing a system configuration example of a defect inspecting system according to an embodiment.

First, an example of a situation in which the present disclosure is applied will be described with reference to FIG. 1. FIG. 1 is a schematic view of an example of an application situation of a defect inspecting system 1 according to the present embodiment. The defect inspecting system 1 according to the present embodiment can assist an operator (hereinafter, also referred to as a "user") so that appropriate determination parameters are set according to features extracted as a defect when a defect inspection on an input image generated by imaging an inspection target is performed. The inspection target includes, for example, a workpiece such as a part or a product in a manufacturing process.

As shown in FIG. 1, for example, the defect inspecting system 1 realizes visual inspection or visual measurement of a workpiece 4 by performing image measurement processing on an input image obtained by imaging the workpiece 4 as an inspection target carried on a belt conveyor 2. In the following description, as a typical example of the image measurement processing, an example in which it is applied to an inspection for the presence or absence of a defect on a surface of the workpiece 4 will be described, but the present disclosure is not limited thereto, and it can also be applied to identify a type of defect, to measure dimensions of an appearance shape of a defect, and the like.

A camera 102 which is an imaging unit is disposed above the belt conveyor 2, and an imaging visual field 6 of the camera 102 is configured to include a predetermined region of the belt conveyor 2. Image data (hereinafter, also referred to as an "input image") generated by the imaging of the camera 102 is transmitted to a defect inspecting device 100. The imaging by the camera 102 is performed periodically or as an event.

The defect inspecting device 100 is connected to a programmable controller (PLC) 10, the database device 12, and the like via a host network 8. Measurement results in the defect inspecting device 100 may be transmitted to the PLC 10 and/or a database device 12. In addition to the PLC 10 and the database device 12, any device may be connected to the host network 8.

The defect inspecting device 100 may be connected to a display 104 for displaying a state during processing, the measurement results, and the like, and a keyboard 106 and a mouse 108 as input units for receiving a user operation.

The defect inspecting device 100 has a classifier generated by machine learning. As an example, the defect inspecting device 100 has a CNN engine. The CNN engine constitutes a classifier using a convolutional neural network, and is configured to generate a probability that the input image belongs to any one of a plurality of classes (classifications) corresponding to predetermined features specified in advance, and a feature extraction image corresponding to each of the classes. Here, the feature extraction image refers to an image obtained by extracting a predetermined feature from the input image, and in the present embodiment, there are five predetermined features (classes) including a background, a black dot, a white dot, a black line, and a white line. The CNN engine generates a feature extraction image in which a predetermined feature is extracted from the input image by performing pre-learning based on a learning data set including learning images and teacher data (labels) prepared for each of the plurality of classes described above. The CNN engine acquires in advance the probability of belonging to a predetermined class and internal parameters adjusted to generate the feature extraction image by the pre-learning using the learning data set. Here, the internal parameters include a neural network configuration (for example, the number of layers in a neural network, the number of neurons in each of the layers, a connection relationship between the neurons, and an activation function of each of the neurons), and hyper-parameters (information indicating an importance of a connection between the neurons and a threshold value of each of the neurons). In the present embodiment, the predetermined features include features relating to a shape of a defect and features relating to a color density of a defect. More specifically, the features relating to the shape of a defect include a point defect and a line defect, and the features relating to the color density of a defect include a white defect and a black defect. Due to combinations thereof, the CNN engine in the present embodiment includes "white dot", "white line", "black dot", and "black line" as a predetermined class, and generates one or more feature extraction images corresponding to each of the classes. The feature extraction images are represented in grayscale. A configuration of the CNN engine and a learning step of the CNN engine will be described later.

Further, the defect inspecting device 100 includes an inspection unit (hereinafter also referred to as a "post-processing unit") which generates a binarized image in which the feature corresponding to each of the classes is represented by a white or black pixel based on one or more feature extraction images output by the CNN engine, and determines the presence or absence of a defect in a target workpiece using the binarized image and parameters for determination (hereinafter also referred to as "determination parameters"). The post-processing unit can detect a size, a position, a type, and the like of a defect in addition to the presence or absence of a defect. Here, the determination parameters are parameters including a binarization level for generating a binarized image, determination items for determining whether or not a feature contained in the binarized image is determined as a defect, and a determination threshold value set corresponding to each of the determination items. The determination items include an area of the pixel showing the feature, a width and a height of a circumscribed rectangle, a perimeter, a circularity, and the like. The circularity is a numerical value for expressing a complexity of a figure. As a value of the circularity becomes greater, it becomes closer to indicating a circle and indicates not a defect but a certain form. The determination threshold value preferably includes a lower limit value and an upper limit value, and is a threshold value for determining a feature having a feature amount included between the lower limit value and the upper limit value as a defect.

Inspection conditions such as the type of the workpiece conveyed on a production line and imaging conditions vary according to the production line, and do not always match conditions at the time of learning. Therefore, when the learned CNN is used in the production line, noise may be included in the feature extraction image according to the internal parameters. The noise is an unnecessary feature amount which is mixed into an image due to, for example, light reflection or shadows. Such noise causes an erroneous determination that there is no defect even when there is a defect, or an erroneous determination that there is a defect even when there is not a defect. Therefore, when the feature extraction image contains noise due to the post-processing unit, it may be necessary to perform processing of separating the noise from the defect. Since the processing of separating the noise and the defect is performed based on the determination parameters, it is troublesome and laborious to manually and appropriately adjust the determination parameters according to the production line, and thus productivity is lowered.

In view of such circumstances, the defect inspecting device 100 according to the present embodiment has a function of updating the determination parameters for separating the noise and the defect contained in the feature extraction image output by the CNN engine from each other in the post-processing unit according to the input image in which a defect determination is actually performed. Specifically, the defect inspecting device 100 according to the present embodiment first generates one or more feature extraction images by applying a learning device (the CNN) to the input image (an inspection image). Then, addition and subtraction processing (which does not have to be performed) and binarization processing based on an initial value of the predetermined binarization level are performed on the one or more feature extraction images to generate a binarized image. Further, the defect inspecting device 100 performs determination processing in which the inspection unit identifies a defective portion based on the initial value of the predetermined determination item and the determination threshold value. At this time, the inspection unit can display results of the determination processing to the user (prompt a region determined as a defect together with the image) and receive feedback from the user. For example, when the inspection unit misses a region (a defect region) detected as a defect, the defect inspecting device 100 can receive an addition of a defect region from the user. Further, when the inspection unit erroneously determines noise as a defect region, the defect inspecting device 100 can receive deletion of a defect region. When the defect inspecting device 100 receives feedback from the user, the defect inspecting device 100 adjusts the determination parameters (the binarization level, the determination items, the determination threshold value) using an image (a setting image)

in which the defect region is designated so that a difference in density between inside and outside the defect region becomes large.

It is not necessary to perform the processing of "receiving the region designation from the user via the display unit". In this case, an image in which the defect region is identified in advance may be acquired (an image in which the defect region is identified in advance may be used as in S201 in a fully automatic mode of FIGS. 7 and 9).

The defect inspecting device 100 according to the present embodiment has a function (a semi-automatic mode) in which the user adjusts at least preset determination parameters as a setting mode of the determination parameter. Thus, since the user may make an adjustment when the preset determination parameters are not appropriate, a load of setting the determination parameters can be reduced. Further, the defect inspecting device 100 according to the present embodiment has a mode for automatically setting the determination parameters (a fully automatic mode) in addition to the semi-automatic mode, and a function for the user to manually set the determination parameters (a manual mode). A first setting mode, a second setting mode, and a third setting mode correspond to the semi-automatic mode, the manual mode, and the fully automatic mode, respectively.

§ 2 Configuration Example

<1. Hardware Configuration of Defect Inspecting Device 100>

Next, a hardware configuration of the defect inspecting device 100 included in the defect inspecting system 1 according to the present embodiment will be described.

Figure 2:
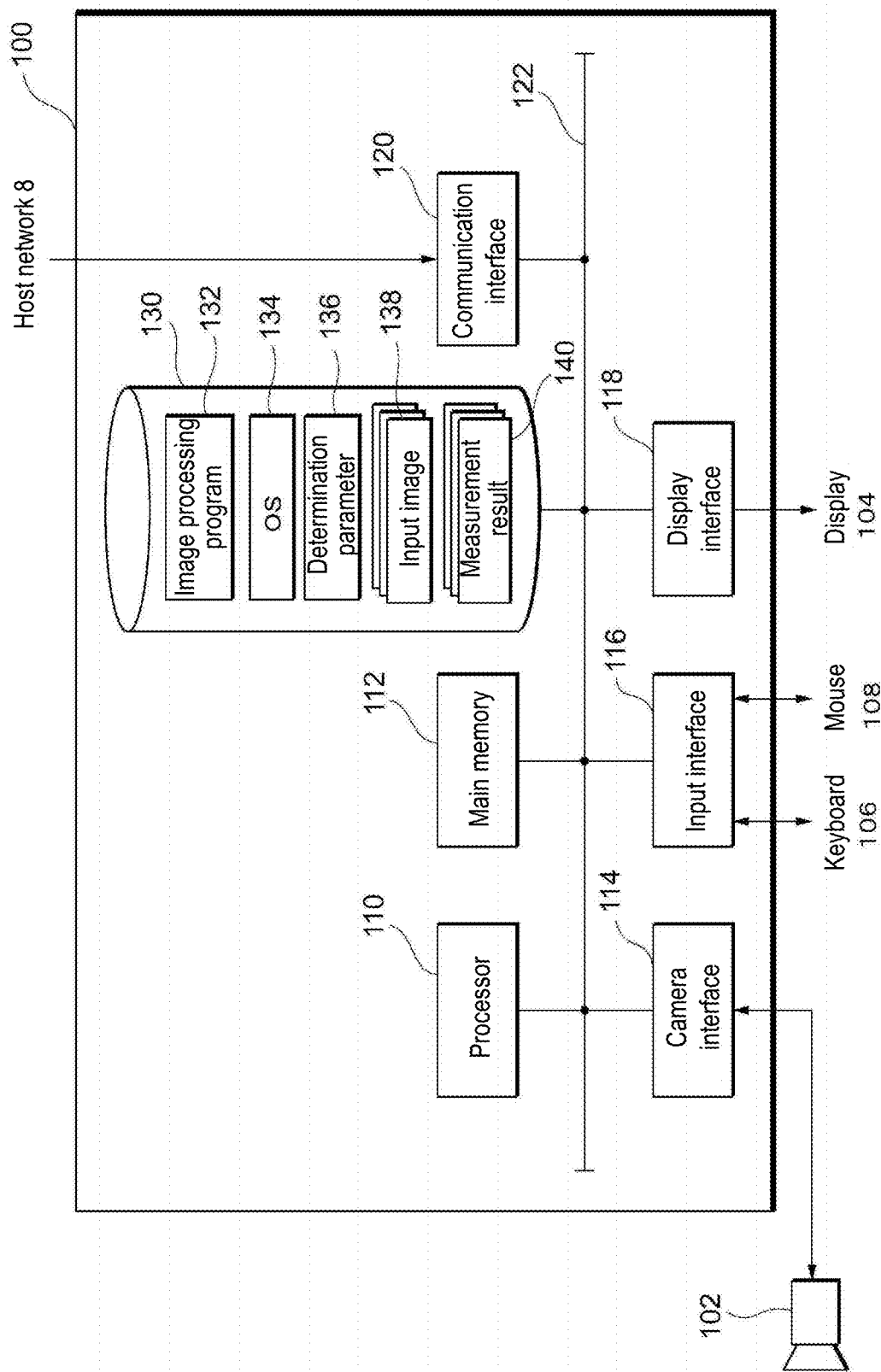
FIG. 2 is a schematic view showing a hardware configuration of a defect inspecting device according to the present embodiment.

FIG. 2 is a schematic view showing the hardware configuration of the defect inspecting device 100 according to the present embodiment. Referring to FIG. 2, the defect inspecting device 100 may be realized, for example, using a general-purpose computer configured according to a general-purpose computer architecture. The defect inspecting device 100 includes a processor 110, a main memory (a main storage unit) 112, a camera interface 114, an input interface 116, a display interface 118, a communication interface 120, a storage (an auxiliary storage unit) 130. These components are typically communicatively connected to each other via an internal bus 122.

The processor 110 realizes a function and processing as described later with reference to FIGS. 3 to 12 by expanding a program stored in the storage 130 to the main memory 112 and executing the program. The main memory 112 is configured of a volatile memory and serves as a work memory required for executing the program with the processor 110.

The camera interface is an example of an acquisition unit. The camera interface 114 is connected to the camera 102 to acquire an input image captured by the camera 102. The camera interface 114 may instruct the camera 102 of an imaging timing and the like.

The input interface 116 is connected to an input unit such as the keyboard 106 and the mouse 108 on which a user operates. The input interface 116 acquires a command indicating an operation or the like performed by the user on the input unit.

The display interface 118 is connected to the display 104 as a display unit. The display interface 118 outputs various processing results generated by the execution of the program by the processor 110 to the display 104.

The communication interface 120 is in charge of processing for communicating with the PLC 10, the database device 12, and the like via the host network 8.

The storage 130 stores programs for making a computer serve as a defect inspecting device 100, such as an image processing program 132 for realizing the CNN engine and an operating system (OS) 134. The storage 130 may further store determination parameters 136 for realizing the image measurement processing as described later, an input image 138 acquired from the camera 102, and measurement results 140 obtained by the image measurement processing.

The image processing program 132 stored in the storage 130 may be installed in the defect inspecting device 100 via an optical recording medium such as a digital versatile disc (DVD) or a semiconductor recording medium such as a universal serial bus (USB) memory. Alternatively, the image processing program 132 may be downloaded from a server device or the like on the network.

The image processing program 132 according to the present embodiment may not include all the software modules for realizing the functions according to the present embodiment, and the necessary functions may be provided by cooperating with the OS.

The image processing program 132 according to the present embodiment may be provided by being incorporated in a part of another program. In that case, the image processing program 132 itself does not include a module included in the other program which is incorporated as described above, and the processing is performed in cooperation with the other program. As described above, the image processing program 132 according to the present embodiment may have a form of being incorporated in another program.

FIG. 2 shows an example in which the defect inspecting device 100 is realized using a general-purpose computer, but the present disclosure is not limited thereto, and all or some of the functions may be realized using a dedicated circuit (for example, an application specific integrated circuit (ASIC), a field-programmable gate array (FPGA), or the like). Further, a part of the processing may be assigned to an external device connected to the network.

<2. Functional Configuration of Defect Inspecting Device 100>

Figure 3:
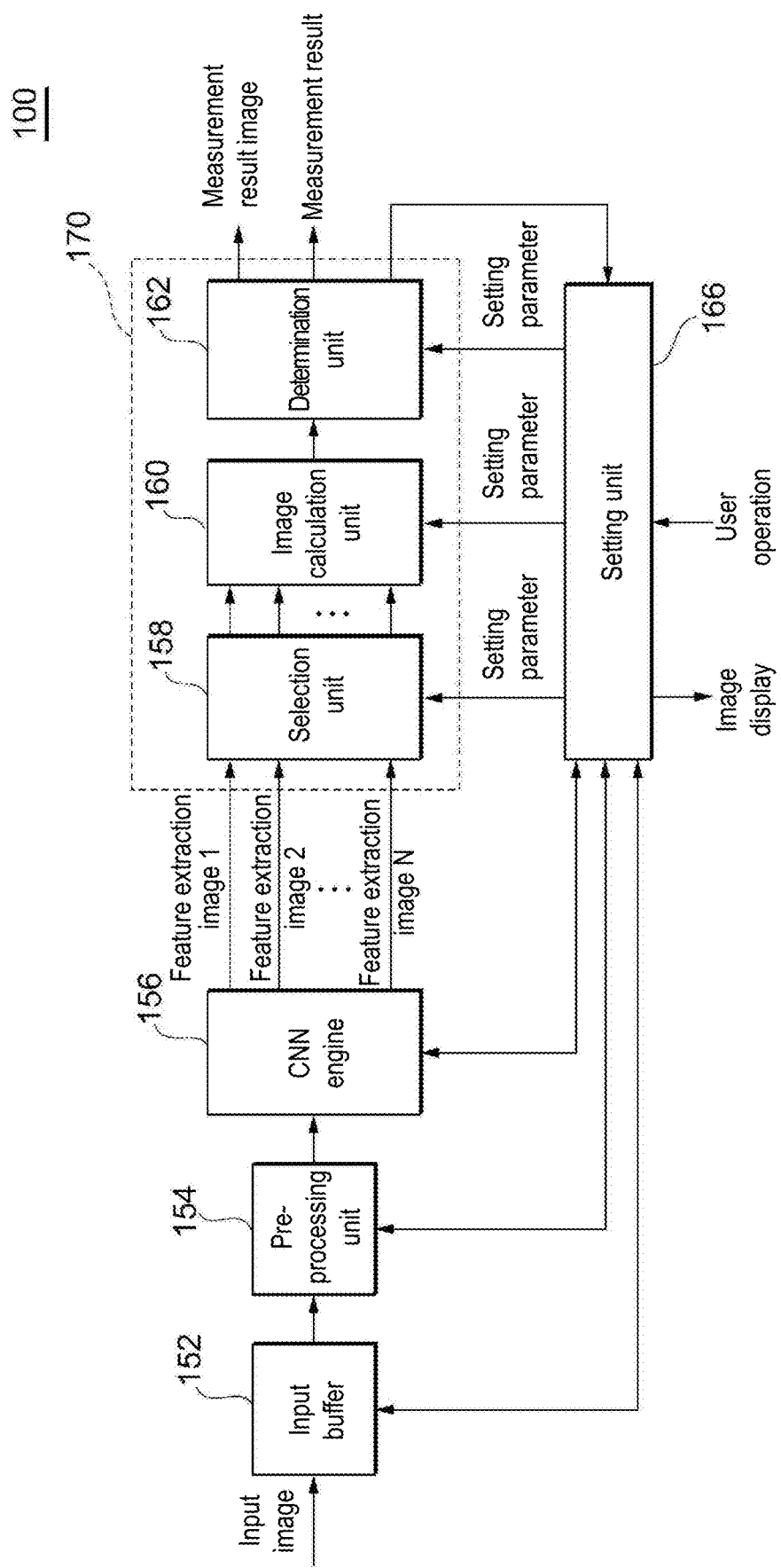
FIG. 3 is a schematic view showing a functional configuration of the defect inspecting device according to the present embodiment.

Next, a functional configuration of the defect inspecting device 100 included in the defect inspecting system 1 according to the present embodiment will be described with reference to FIGS. 3 and 4. In FIG. 3, the CNN engine 156 corresponds to an image generating unit, and the post-processing unit 170 (particularly the determination unit 162) corresponds to the inspection unit.

FIG. 3 is a schematic view showing the functional configuration of the defect inspecting device 100 according to the present embodiment. Each of the functional configurations included in the defect inspecting device 100 is typically calculation processing realized by the above-described processor 110 executing the image processing program 132. Further, FIG. 4 is a schematic view for explaining an example of an inspection step (an operation step) in the defect inspecting device 100 according to the present embodiment.

Referring to FIG. 3, the defect inspecting device 100 includes an input buffer 152, a pre-processing unit 154, a CNN engine 156, a post-processing unit 170, and a setting unit 166 as the functional configuration. Hereinafter, each of functional units will be described in detail.

(2-1. Input Buffer 152)

The input buffer 152 temporarily stores the input image captured by the camera 102. The input buffer 152 is realized by the processor 110 storing the input image in the storage 130. The input buffer 152 can be accessed from the pre-processing unit 154 and the setting unit 166.

(2-2. Pre-Processing Unit 154)

The pre-processing unit 154 performs necessary pre-processing on the input image stored in the input buffer 152. The pre-processing unit 154 according to the present embodiment generates a pre-processing filter at the time of starting the inspection step (hereinafter, also referred to as a "preparation step"). The pre-processing filter is, for example, a parameter (a filter parameter) for converting the input image. Specific examples of the pre-processing filter include brightness correction, color gray conversion, enlargement and reduction of the input image described later, and the like. The pre-processing filter may be appropriately applied to the input image depending on the mode.

The CNN engine 156 which will be described later acquires internal parameters for extracting a predetermined feature extraction image by pre-learning. Thus, the CNN engine 156 can extract a feature which falls within a range of a feature amount defined by the internal parameters. However, the range of the feature amount corresponding to the internal parameters is determined depending on the type of the defect contained in the learning data used to generate a learned model. Therefore, when a defect having a unique feature not included in the learning data occurs on the production line, the feature amount of the defect deviates from a feature amount acquired by the pre-learning, and erroneous recognition (missing) may occur. In addition, when a pattern in a background region having unique features which are not included in the learning data occurs on the production line, the pattern in the background region may match a range of the feature amount acquired by the pre-learning, and the erroneous recognition (the missing) may occur.

Therefore, the pre-processing unit 154 generates a pre-processing filter capable of converting the input image as follows in the preparation step.

The input image is enlarged or reduced so that a width of the feature amount in the region corresponding to the defect contained in the input image is included in the region of the feature amount corresponding to the internal parameters.

The input image is enlarged or reduced so that a feature in a non-defect region included in the input image does not fall in the feature amount extracted by the internal parameters.

Then, in a step of actually performing the inspection (hereinafter, also referred to as an "operation step"), the input image is converted by applying the pre-processing filter as the pre-processing to the input image (S1 in FIG. 4). Such pre-processing is intended to process the input image to facilitate the extraction of the features in the CNN engine 156 in a latter stage. The content of the pre-processing may be designated by the user via the setting unit 166. The input image after the pre-processing (hereinafter, also referred to as a "preprocessed image") is output to the CNN engine 156 (S2 in FIG. 4).

(2-3. CNN Engine 156)

The CNN engine 156 provides a feature extraction image generation function which generates a plurality of feature extraction images corresponding to a plurality of pre-learned classes by applying the CNN engine 156 having the plurality of classes to the input image. The plurality of feature extraction images generated by the CNN engine 156 is output to the post-processing unit 170 and can be accessed from the setting unit 166.

Hereinafter, the function of the CNN engine 156 will be described in more detail.

The CNN engine 156 is configured to output a probability prob (n) that an input image belongs to the plurality of classes (classifications: n) designated in advance when the image is input. The probability is calculated for each of a plurality of classes (classifications) designated in advance. The CNN engine 156 in the present embodiment outputs a probability prob (n) of which class the input image belongs to due to the pre-learning and a feature extraction image (a feature extraction image 1, a feature extraction image 2, . . . , a feature extraction image N) belonging to the class (S3 in FIG. 4). In the present embodiment, the plurality of classes is five classes including a background, a black dot, a white dot, a black line, and a white line. The feature extraction image which extracts features classified into the classes of the "white dot", the "black dot", the "white line", and the "black line" is generated by inputting the input image captured by the camera 102 or the like to the CNN engine 156. In the feature extraction image shown in FIG. 4, a large density difference between one region showing each of features and the other region is displayed. Examples of displaying the large density difference may include a mode in which the density difference is displayed brighter than other regions and a mode in which the density difference is displayed darker than other regions, but the present disclosure is not limited thereto, and any mode may be used as long as the region showing a predetermined feature can be distinguished.

As described above, the CNN engine 156 acquires the internal parameters for generating the feature extraction image corresponding to each of the classes by the pre-learning. For example, when a "white line" or "black line" class is extracted, the internal parameters can be represented by the number of pixels in the width of the defect which can be extracted. The internal parameters are acquired according to the type of the defect contained in a learning image provided by the pre-learning.

The CNN engine 156 in the present embodiment has one or a plurality of convolution layers, one or a plurality of pooling layers, a fully coupled layer, and a softmax layer. Information of each of the input images is output to the fully coupled layer via the plurality of convolution layers and the plurality of pooling layers. The features of the image are extracted by convolution processing by the convolution layer and image size compression processing by the pooling layer.

The fully coupled layer couples image data of which the features have been extracted via the convolution layer and the pooling layer to a specific node, and outputs feature variables converted by a predetermined function. Each of the nodes provided in the fully coupled layer becomes the image data corresponding to the plurality of classes designated in advance.

The output of the fully coupled layer is an output to the softmax layer (an output layer). In the softmax layer, the probability prob (n) of belonging to any of the plurality of class classifications (n) designated in advance is output in a range of 0 to 1.

Calculation equations for the convolution layer and the fully coupled layer are as expressed by Equations (1) and (2), respectively. In each of the equations, multiple importance W and bias B are hyper-parameters included in the internal parameters, and the internal parameters are determined by learning. A calculation equation for the softmax layer is expressed by Equation (3).

Calculation equation of convolution layer

[Math. 1]

$$I_{top}(X, Y, n) = \sum_{c=0}^{C-1}\sum_{y=0}^{K_y-1}\sum_{x=0}^{K_x-1} W(x, y, c, n) \cdot I_{btm}(X + x_x, Y + y, , c) + B(n)$$

Equation 1

$I_{top}(X,Y,n)$: Output image
$I_{btm}(x,y,c)$: Input image
W(x,y,c,n): Convolution coefficient
B(n): Bias
Kx, Ky: Kernel size of convolution
C: The number of channels in input image Calculation equation of fully coupled layer

[Math. 2]

$$I_{top}(n) = \sum_{c=0}^{C-1} W(c, n) \cdot I_{btm}(c) + B(n)$$

Equation 2

$I_{top}(n)$: Output image
$I_{btm}(c)$: Input image
W(c,n): Fully coupling coefficient
B(n): Bias
C: The number of channels in input image Calculation equation of softmax layer

[Math. 3]

$$prob(n) = \frac{\exp(I_{btm}(n))}{\sum_{i=0}^{N-1}\exp(I_{btm}(i))}$$

Figure 5B:
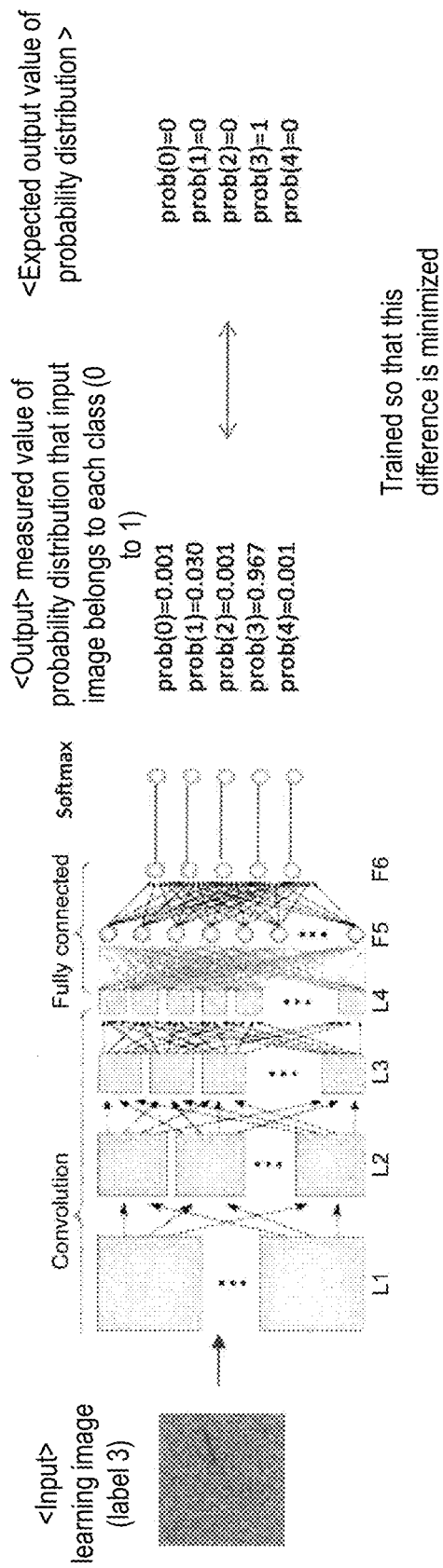
FIG. 5B is a schematic view for explaining an input, an output and an expected value at the time of learning of the CNN engine according to the present embodiment.
Figure 6:
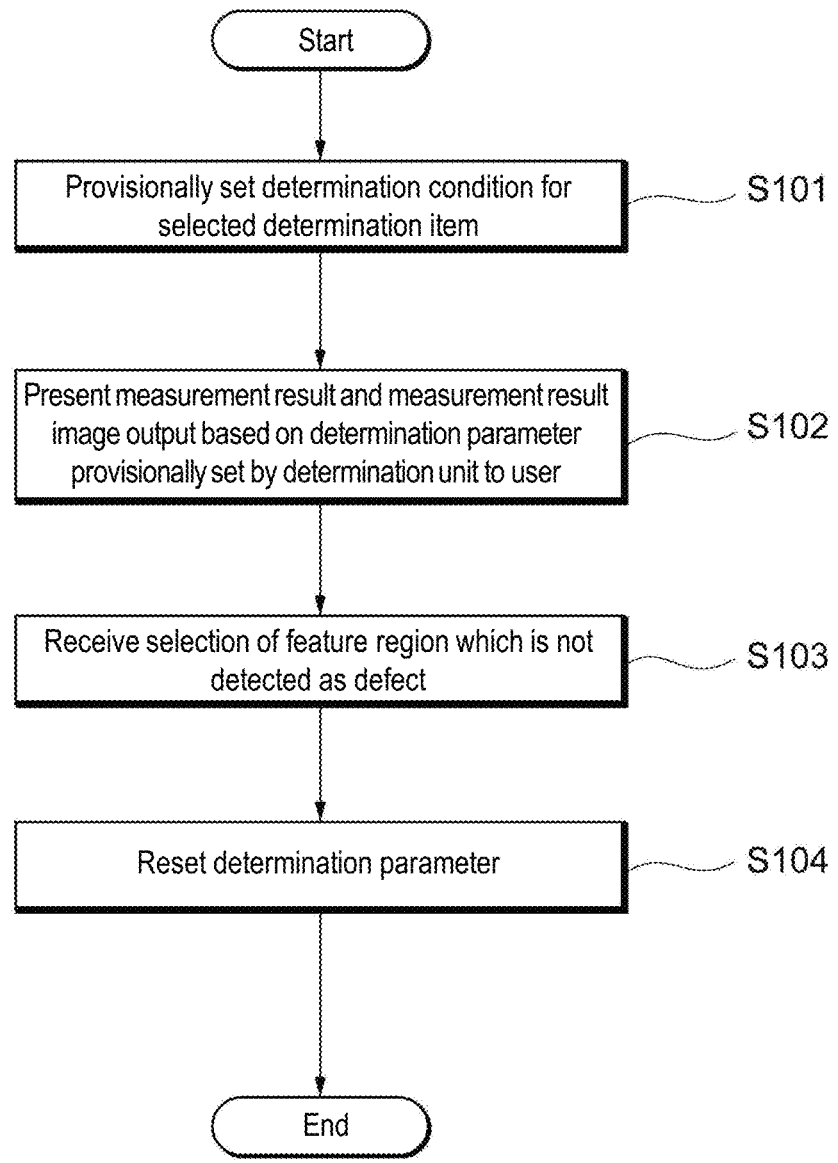
FIG. 6 is a flowchart for explaining an example of processing of a semi-automatic setting mode in the defect inspecting system according to the present embodiment.

Equation 3 prob(n): Probability of belonging to the nth classification (0 to 1)
$I_{btm}(c)$: Input image
N: The number of classifications Next, the learning of the CNN engine 156 in the present embodiment will be described. FIG. 5A shows an example of a learning data set including a learning image and teacher data (label) used in the present embodiment. Further, FIG. 5B shows an outline of a learning step using a set of the learning data and the teacher data shown in FIG. 5A.

As shown in FIG. 5A, the learning data has learning images corresponding to the plurality of classes (classifications: n) designated in advance. In the present embodiment, as shown in FIG. 5A, a plurality of learning images corresponding to each of five types of classes including a background, defects represented by black dots, defects represented by white dots, defects represented by black lines, and defects represented by white lines are prepared. Further, in each piece of image data for learning, the teacher data (the label) indicating the classification of each image data is assigned using the numbers 0 to 4. More specifically, 0 is assigned to the background, 1 is assigned to the defects represented by the black dots, 2 is assigned to the defects represented by the white dots, 3 is assigned to the defects represented by the black lines, and 4 is assigned to the defects represented by the white lines.

As shown in FIG. 5B, in the learning of the CNN engine 156, first, values of all the hyper-parameters constituting the inside of the CNN are initialized by random numbers. Subsequently, the learning image included in the learning data set shown in FIG. 5A is input to the CNN engine 156, and a probability distribution prob (n) is output. Subsequently, a measured value prob (n) of the probability distribution output by the CNN engine 156 is compared with an expected output value of the probability distribution. Here, the expected output value of the probability distribution is that the probability distribution prob (n) of the label corresponding to the input learning image is 1 and the probability distribution prob (n) of the label not corresponding to the input learning image is zero. Therefore, as shown in FIG. 5B, when the input image contains the defects represented by the black lines, and 3 is associated as the teacher data (the label), preferably, the expected output value of the probability distribution is prob(3)=1 and the expected output value of the other probability distribution is prob (n: 0, 1, 2, 4)=0. Therefore, the learning of the CNN engine 156 is processing of searching for and updating combinations of the hyper-parameters so that, when a certain learning image is input, a difference between the measured value of the probability distribution output by the Softmax layer and the expected output value of the label corresponding to the learning image is minimized.

The update of the hyper-parameters is performed by calculating the probability distribution prob(n) using a plurality of learning images and repeatedly calculating the values of the hyper-parameters using the sum of cross entropy of the measured value and the expected output value of the probability distribution as a loss function to minimize the loss function expressed by the following Equation (4). At this time, a gradient descent method and an error back propagation method can be used for the calculation of the hyper-parameters. When a difference between the hyper-parameters before and after the update is less than a predetermined value, the learning is completed.

Calculation equation of loss function (cross entropy)

[Math. 4]

$$Loss = \sum_{i=0}^{Cnt}\sum_{n=0}^{N-1}\{ex(n)\cdot\log[prob(n)] + (1 - ex(n))\cdot\log[1 - prob(n)]\}$$

Equation 4 prob(n): Measured value of probability of belonging to nth classification (0 to 1)
ex(n): Expected value of probability of belonging to nth classification (0 or 1)
N: The number of classifications
Cnt: The number of learning images (2-4. Post-processing unit 170)

The post-processing unit 170 generates a measurement result image by performing the post-processing on at least some of the plurality of feature extraction images output from the CNN engine 156. Specifically, the post-processing unit 170 outputs the measurement result image by selecting designated one or a plurality of feature extraction images from the plurality of feature extraction images output by the CNN engine 156, and performing the post-processing (S4 in FIG. 4). A selection of one or a plurality of feature extraction images may be designated by the user via the setting unit 166 as shown in FIG. 3. The post-processing unit 170 may output measurement results together with the measurement result image. The measurement results include determination results (for example, the presence or absence of a defect, a size of a defect pattern, a position of the defect pattern, or the like) obtained when the defect inspection processing is performed on the input image.

In the present embodiment, the post-processing unit 170 includes a selection unit 158, an image calculation unit 160, and a determination unit 162.

The selection unit 158 selects one or a plurality of feature extraction images from the plurality of feature extraction images output from the CNN engine 156, and outputs the selected feature extraction images to the image calculation unit 160. The selection unit 158 may receive a user's selection via the setting unit 166 described later when the feature extraction images are selected.

When the selection unit 158 selects a plurality of feature extraction images, the image calculation unit 160 performs the predetermined image processing as necessary, and outputs the results thereof to the determination unit 162. Here, the image calculation processing includes performing arbitrary mathematical processing including four fundamental arithmetic operations between corresponding pixels in a plurality of images. More specifically, the image calculation unit 160 may perform addition processing between images, subtraction processing between images, and weighted calculation processing thereof as the image calculation processing, for example, using two or more feature extraction images among a plurality of selected feature extraction images.

Figure 4:
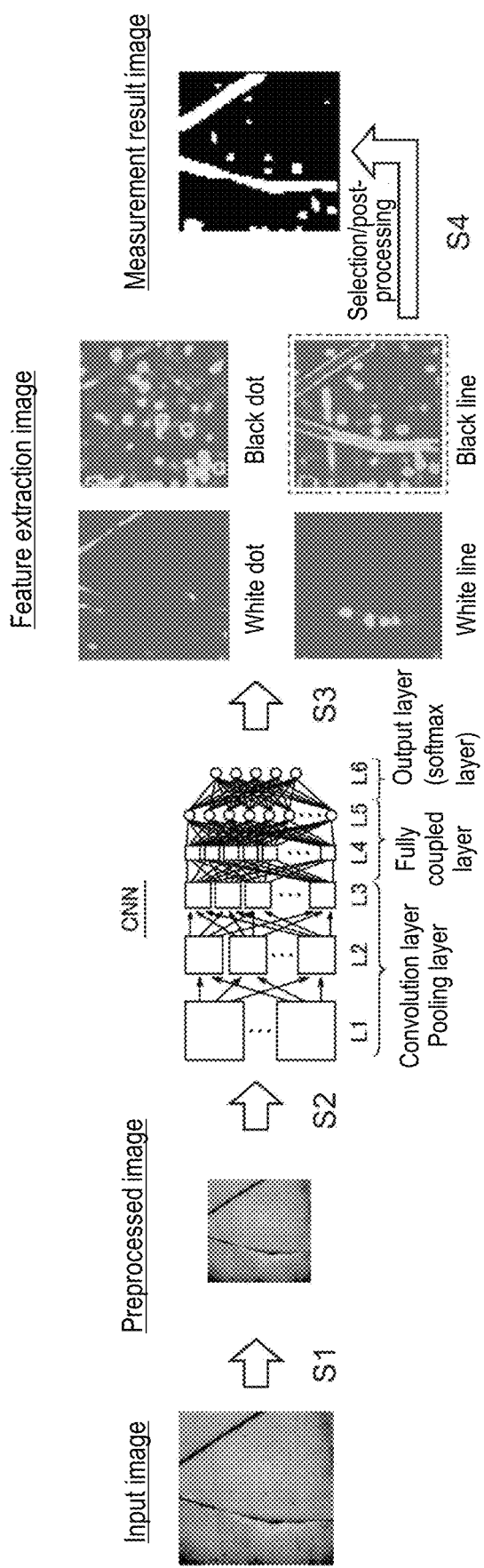
FIG. 4 is a view for explaining an example of a processing procedure of image measurement processing using CNN in the defect inspecting system according to the present embodiment.

FIG. 4 shows an example in which the feature extraction image of the "black line" is selected as the most appropriate feature extraction image by the selection unit 158. However, in this example, a feature corresponding to the "black dot" also appears in the feature extraction image of the "black line". That is, dot-shaped feature portions appear in common in both the feature extraction image of the "black line" and the feature extraction image of the "black dot". In view of the input image, the feature corresponding to the "black dot" does not show a defect and is noise. As described above, according to the type and size of the features included in the input image, it is difficult to separate a defect from a pattern other than the defect (for example, a background portion and noise). At this time, the image calculation unit 160 can extract only a target feature by performing the image calculation processing to reduce the features appearing in the other feature extraction image from one feature extraction image. That is, in the example shown in FIG. 4, the image calculation unit 160 performs processing of obtaining a difference between a luminance value of each of the pixels constituting the feature extraction image of the "black line" and a luminance value of each of the pixels constituting the feature extraction image of the "black dot". On the other hand, the features corresponding to the defects may appear dispersedly in the feature extraction images of a plurality of classes. For example, this is a case in which there is a plurality of scratch-like defects on an inspection target, that is, a case in which one scratch-like defect is extracted in the feature extraction image of the "white line", and the other scratch-like defect is extracted in the feature extraction image of the "black line" due to lighting conditions. In such a case, the image calculation unit 160 may perform the addition processing of the feature extraction image of the "white line" and the feature extraction image of the "black line". In this way, it is possible to generate an image including the features extracted as defects by performing the addition and subtraction processing and the weighted calculation processing between images with respect to the plurality of selected feature extraction images.

When the selection unit 158 selects only one feature extraction image, the image calculation unit 160 may output the feature extraction image to the determination unit 162 as it is without performing the image calculation processing. Further, the image calculation unit 160 may receive from the user what kind of image calculation processing is to be performed via the setting unit 166.

The determination unit 162 performs binarization processing and determination processing on the feature extraction image (processed by the image calculation processing or unprocessed by the image calculation processing) output by the image calculation unit 160 according to the determination parameters at least input from the setting unit 166 described later and outputs the measurement result image. The determination unit 162 may output the measurement results together with the measurement result image.

In the present embodiment, the determination parameters include at least the binarization level or the determination conditions. The binarization level is a threshold value used when the determination unit 162 generates a binarized image by binarization processing on a feature extraction image or on an image obtained from image processing on a plurality of feature extraction images by the image calculation unit 160. Further, the determination conditions are information obtained by combining the determination items (for example, an area of the image when it is detected as a defect, a width and a height of a circumscribed rectangle, a perimeter, an aspect ratio, a circularity, and the like) indicating the type of the feature amount used by the determination unit 162 to determine whether or not the binarized image contains a defect and the determination threshold value set in each of the determination items and indicating a range of the feature amount detected as a defect. Preferably, the upper limit and the lower limit are set in the determination threshold. Further, the determination items included in the determination conditions are not limited to a single item, and a plurality of determination items may be included. In this case, the determination conditions refer to information on the combination of the plurality of determination items and the threshold values set for each of the plurality of determination items. The determination parameters may further include information which designates a determination logic.

In the following description, an example in which the determination parameters are set by processing of the setting unit 166 described later will be described, but when a learning device in which machine learning is performed is used as the post-processing unit 170, the determination parameters may have a configuration acquired by the pre-learning. In this case, the determination parameters are updated to appropriate values by the processing of the setting unit 166 described later.

The details of the binarization processing and the determination processing of the determination unit 162 will be described.

The binarization processing is processing in which the determination unit 162 generates a binarized image from an image (hereinafter, referred to as an "intermediate image") processed by the image processing of the image calculation unit 160 with respect to the feature extraction image or the plurality of feature extraction images according to the binarization level included in the determination parameters. More specifically, as the binarization processing, the determination unit 162 first generates the binarized image based on the binarization level included in the determination parameters with respect to the intermediate image output by the image calculation unit 160. The binarization level is, for example, a threshold value related to an intensity of a pixel. For example, a case in which the determination unit 162 generates a binarized image in which the density of the feature extraction image is represented by two values of white and black will be described as an example. In this case, since the density of an original feature extraction image has continuous values, the determination unit 162 converts all the pixels having the intensity equal to or higher than the binarization level into black, converts all the pixels having the intensity less than the binarization level into white, and thus generates the binarized image obtained by binarizing the feature extraction image. A corresponding relationship between the intensity and black and white is not limited thereto, and may be reversed.

Next, the determination processing is processing in which the determination unit 162 generates a measurement result image (or the measurement result image and the measurement results thereof) from the binarized image (which is an example of the intermediate image) according to the determination conditions included in the determination parameters. More specifically, as the determination processing, the determination unit 162 extracts a block of pixels (hereinafter, also referred to as a "first feature region") in which the same colors are connected in the binarized image generated by the binarization processing. Then, the determination unit 162 extracts a region detected as a defect from the extracted first feature region based on the determination conditions provided as the determination parameters. Then, the measurement result image in which only the first feature region to be detected as a defect is extracted is generated and output.

For example, when a determination condition with an area as the determination item is provided and when an area of a certain first feature region is within a range of a determination threshold provided as the determination condition, the determination unit 162 extracts the first feature region as a region detected as a defect. Then, the determination unit 162 generates a measurement result image in which the region detected as a defect is extracted from the binarized image.

(2-5. Setting Unit 166)

The setting unit 166 sets the determination parameters used by the determination unit 162 for the determination processing and outputs them to the determination unit 162. The setting unit 166 according to the present embodiment has the following three types of modes for setting the determination parameters.

Manual mode
Semi-automatic mode
Fully automatic mode

The setting unit 166 may have at least the semi-automatic mode among the above setting modes, and it is not essential to have all the modes. Setting processing of each of the modes will be described in detail.

(1) Manual Mode

In the manual mode, the setting unit 166 receives from the user the setting of a selection of the determination items and the determination threshold value (the upper limit and the lower limit) to be set in the selected determination items as the setting of the determination conditions. In addition, the setting unit 166 also receives the setting of the binarization level from the user in the manual mode. The setting unit 166 outputs the received binarization level and determination conditions to the determination unit 162 as the determination parameters.

(2) Semi-Automatic Mode

The semi-automatic mode is a mode in which the setting unit 166 provisionally sets the determination parameters and then receives a parameter adjustment from the user, and is a setting mode in which the provisional setting of the determination parameters is automatically performed in a state in which the user can adjust the determination parameters. An example of the processing of the setting unit 166 in the semi-automatic mode will be described with reference to FIG. 6.

In the semi-automatic mode, first, the setting unit 166 provisionally sets the determination parameters and outputs them to the determination unit 162 (S101). Specifically, the setting unit 166 may provisionally set the determination conditions based on the features of the defects contained in the learning image included in the learning data set used for training the CNN engine 156. Further, the setting unit 166 may provisionally set the determination conditions based on the internal parameters acquired by the CNN engine 156. Here, the learning image contains various types of defects. Therefore, when the features in the shape of the defect, for example, an area, a length, a perimeter, a circularity, and the like of the defect are clear, the determination items and the determination threshold values are set based on the shape of the defect contained in the learning image. Thus, the determination conditions corresponding to a distribution of shapes of the defects contained in the learning image included in the learning data set can be set, and the defect having the same shape as a defect contained in the learning data set can be detected. Also, since the internal parameters of the CNN engine 156 acquired using the learning data set are acquired to detect the various types of defects contained in the learning image, the determination conditions which can detect the defects having the same shape as that of the defects contained in the learning data can be set by setting the determination items and determination threshold values based on the internal parameters of the CNN engine 156. In this way, for example, the setting unit 166 provisionally sets the feature amount corresponding to the learning image or the internal parameters as the determination threshold value. At this time, preferably, the setting unit 166 provisionally sets the determination parameters in consideration of the pre-processing filter set by the pre-processing unit 154. For example, when the input image is enlarged or reduced by the pre-processing filter, preferably, the determination threshold values for the determination items such as the area and the like of the first feature region are provisionally set to be enlarged than the pre-learned internal parameters in consideration of an enlargement and reduction ratio by the pre-processing filter.

The binarization level and the determination items may be configured to be designated by the user in advance. Thus, the provisional setting processing of the determination parameters can be speeded up. In this case, in the processing of S101, the setting unit 166 provisionally sets the determination threshold values as the determination parameters based on the internal parameter for each of the determination items designated by the user.

When the determination parameters provisionally set by the determination unit 162 is output to the determination unit 162 (S102), the determination unit 162 extracts a region which matches the provisionally set determination parameters as a region detected as a defect (hereinafter, referred to as a "second feature region") from the first feature region extracted in the binarized image. Then, in the binarized image, a setting image in which the second feature region is highlighted is output (refer to FIG. 10B). The setting unit 166 prompts the output setting image to the user, and receives a selection of the second feature region to be excluded (that is, not detected as a defect) (hereinafter, referred to as a "third feature region") from the highlighted second feature region (S103). The determination unit 162 may be configured to prompt the measurement result image as the setting image to the user and to receive a selection of the third region from the region detected as a defect in the measurement result image.

Figure 7:
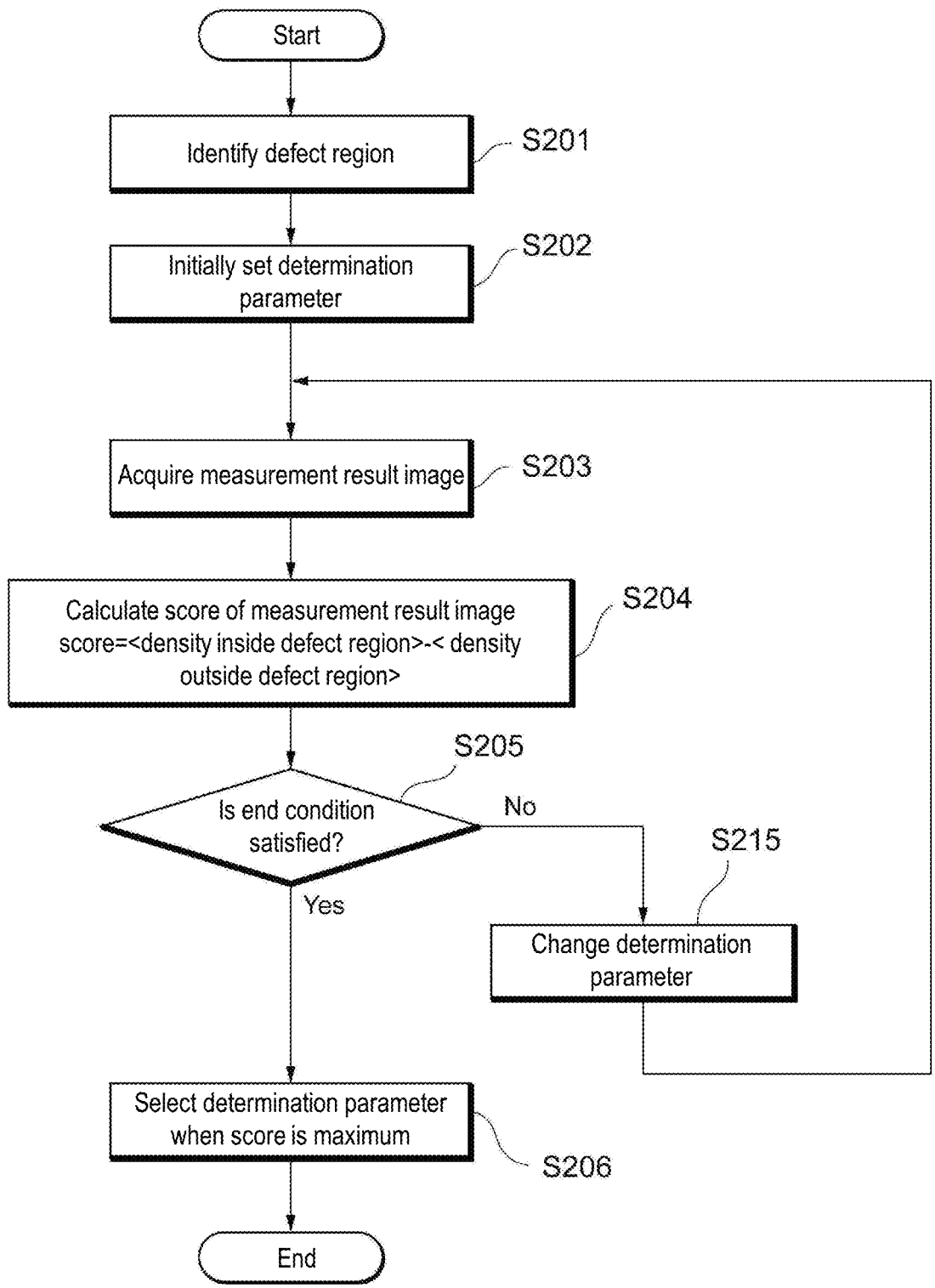
FIG. 7 is a flowchart for explaining an example of processing of an automatic and manual setting mode in the defect inspecting system according to the present embodiment.

Then, the setting unit 166 sets the determination conditions again so that the third feature region is not detected as a defect. Specifically, the setting unit 166 resets the determination threshold values so that a feature amount of the third feature region is not included in the range of the determination conditions (S104). As shown in FIG. 7, the determination threshold values are reset (updated) by a difference in image score which is determined based on a difference in color density of the pixel between the inside and the outside of the region detected as a defect. At this time, the setting unit 166 may select determination items different from the determination items included in the provisionally set determination parameters and may set the determination threshold values.

As described above, in the semi-automatic mode, the appropriate determination parameters can be set by adjusting the determination parameters which provisionally set in advance. As a result, it is possible to easily set the determination parameters suitable for detecting a defect with high accuracy.

(3) Fully Automatic Mode

In the fully automatic mode, the setting unit 166 receives from the user the designation of the region to be detected as a defect (hereinafter, also referred to as a "defect region") with respect to the input image, and automatically sets the determination parameters based on the designated defect region. An example of the processing of the setting unit 166 in the fully automatic mode will be described with reference to FIGS. 7 to 9.

FIG. 7 is an example of a processing flow of the setting unit 166 when the determination parameters are automatically set based on one input image.

Figure 8:
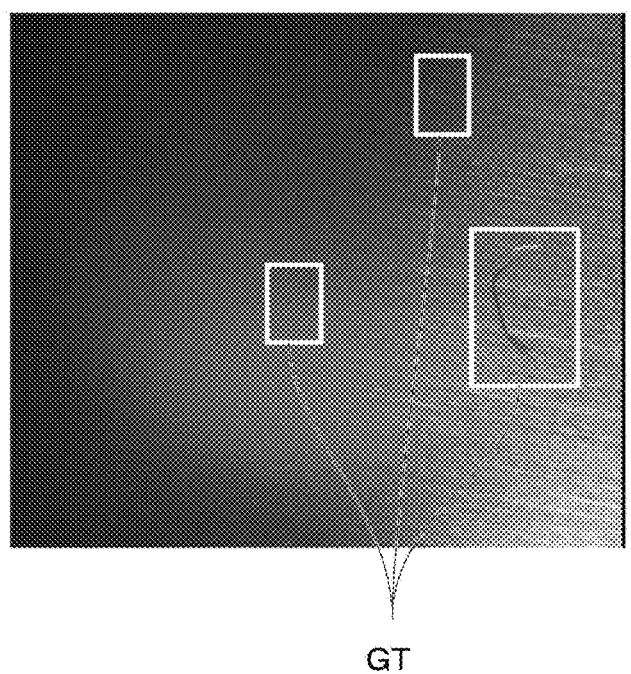
FIG. 8 is a view for explaining an example of a defect region in the defect inspecting device according to the present embodiment.

First, the setting unit 166 receives from the user the identification of the defect region with respect to the input image (S201). FIG. 8 is a view showing an example of the identified defect region. In FIG. 8, a rectangle GT corresponds to the defect region. The defect region is not limited to a rectangle, and may have an arbitrary shape having an area.

Returning to FIG. 7, the continuation of the flow will be described.

When the defect region is designated, the CNN engine 156 generates a feature extraction image. At this time, the setting unit 166 initially sets the determination parameters (S202). The initial setting of the determination parameters is, for example, initialization of the binarization level, selection of the determination items, and initialization of the determination threshold values corresponding to the selected determination items. The setting unit 166 may provisionally set the binarization level and the determination parameters including the determination conditions based on features of the defects contained in the learning image included in the learning data set used for training the CNN engine 156. Further, the setting unit 166 may provisionally set the binarization level and the determination parameters including the determination conditions based on the internal parameters acquired by the CNN engine 156. The binarization level and the determination items may be configured to be designated by the user in advance. Thus, the processing of setting the determination parameters can be speeded up. The determination unit 162 generates the binarized image based on the binarization level included in the initially set determination parameters. Further, the determination unit 162 generates the measurement result image based on the determination items and the determination threshold values included in the initially set determination parameters.

The setting unit 166 acquires the generated measurement result image (S203) and calculates the score (the image score) (S204). Specifically, the setting unit 166 calculates the difference between the color density of the pixel inside the defect region and the color density of the pixel outside the defect region in the measurement result image as the score. Here, the color density of the pixel can be said as a ratio of the pixels corresponding to features including a defect (hereinafter referred to as the feature pixel) inside the defect region or outside the defect region (hereinafter, referred to as a target region). The ratio of the feature pixels in each of the target regions may be the number (the number, an area, or the like) of the feature pixels included in the target region, and may be a ratio of the total number of feature pixels to the total number of pixels (hereinafter, referred to as non-feature pixels) which do not correspond to the features in the target region, or a ratio of the feature pixels or the non-feature pixels to the number of all pixels in the target region.

In the binarized image, when white pixels correspond to the feature region, the non-feature region corresponds to black pixels. In this case, the color density of the pixels in the defect region is the number of white pixels in the defect region, the color density of the pixels outside the defect region is the number of white pixels outside the defect region, and thus a difference between the two densities can be used to calculate the score.

When a density value corresponding to a color of each of the pixels (for example, 1 for white and 0 for black) is preset, the total value of the density values for the pixels in each of the target region may be calculated as a first image score.

As described above, the measurement result image is an image obtained by extracting the second feature region from the first feature region included in the binarized image. Therefore, when the second feature region is appropriately extracted in the defect region (that is, when the defect is not missed), the density in the defect region becomes large. On the other hand, when the second feature region is not extracted outside the defect region (that is, when the missing does not occur), the density outside the defect region becomes small. That is, when the determination parameters are set most appropriately, a difference (the score) between the density inside the defect region and the density outside the defect region becomes maximum. Therefore, the setting unit 166 can search for the appropriate determination parameters by calculating and comparing the scores.

Therefore, the setting unit 166 repeatedly performs the processing of S203 and S204 until an end condition is satisfied (S205) while the determination parameters are changed (S215). The end condition is, for example, a case in which the score is calculated for all possible determination threshold values, a case in which the score converges to a certain value, or the like. Further, the end condition may be set as an elapsed time from the start of this processing flow or as a threshold value for the number of trials of the processing of S203 and S204.

For example, the setting unit 166 may fix the binarization level and the determination item, may change the determination threshold value variously, may repeat the processing of S203 and S204, then may set the next determination item, may change the determination threshold value variously and may repeat the processing of S203 and S204. Alternatively, the binarization level, the determination item, and the determination threshold value may all be changed each time the processing of S203 and S204 are repeated.

When it is determined that the end condition is satisfied (S205: YES), the setting unit 166 selects the determination parameter having the maximum score, and updates the determination parameter to the selected determination parameter (S206). It is not always necessary to select the determination parameter which maximizes the score among all the determination parameters which can be taken. For example, the maximum score t among the scores calculated within the predetermined elapsed time or the predetermined number of trials and the determination parameter corresponding to the score may be selected. That is, a configuration thereof may be so that the determination parameter which obtains a score relatively larger than that in the determination parameter set at the start of the processing flow is selected. Here, when the determination items of the determination parameters when the score becomes maximum are an area, a width and/or a height of a circumscribed rectangle, a perimeter, an aspect ratio, and a circularity, the determination threshold value when the score becomes maximum is preferably used as the lower limit value. Further, when the determination item of the determination parameter when the score is maximum is the circularity, the determination threshold value when the score is maximum is preferably used as the upper limit value. Further, when a plurality of defect regions are identified for one image, and when the determination threshold value is calculated so that a difference between the image scores inside and outside the region is maximized for each of the defect regions, the maximum value and the minimum value of the plurality of calculated determination threshold values may be set as the upper limit value or the lower limit value of the determination threshold value according to the type of the determination item.

Figure 9:
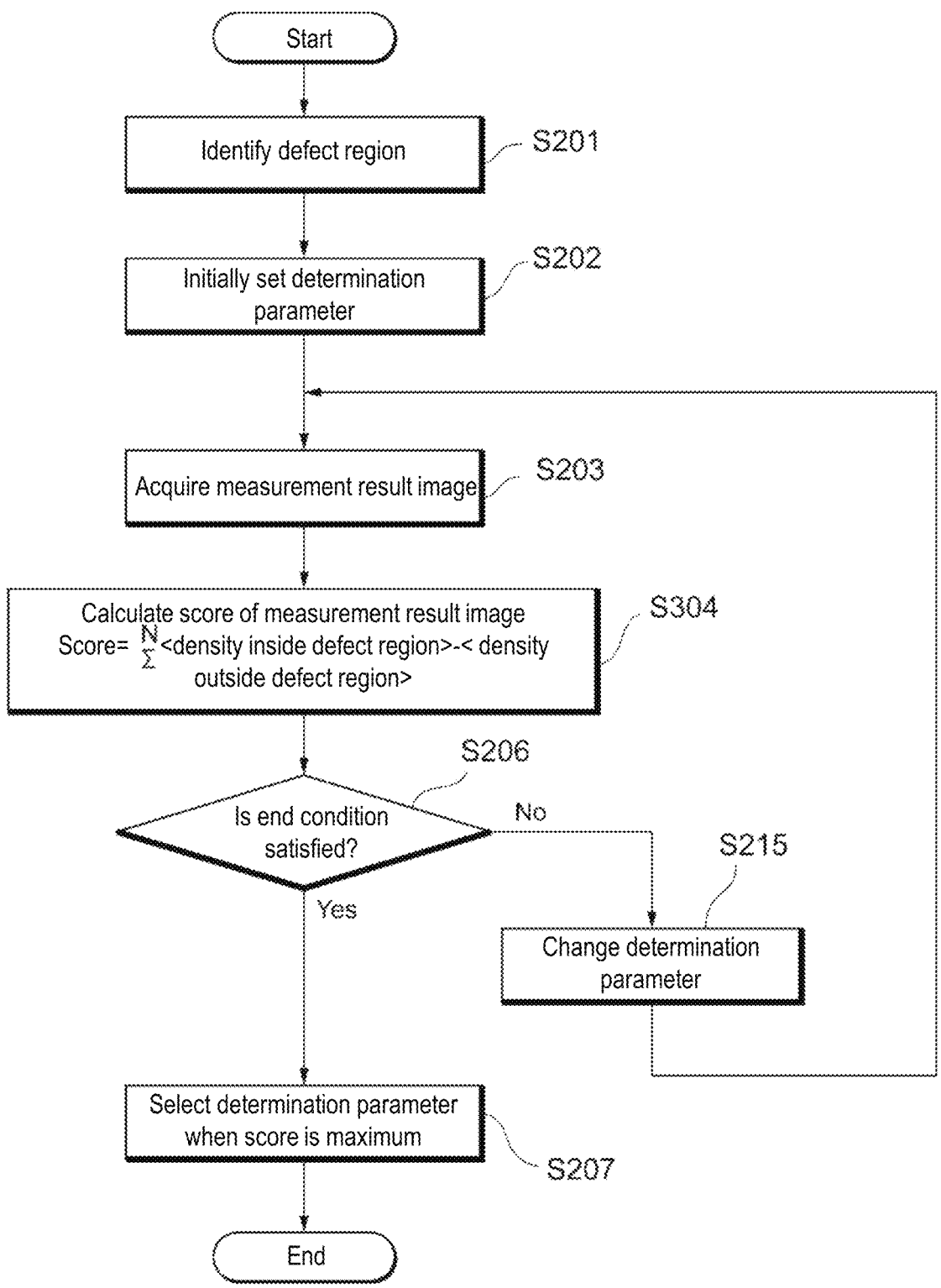
FIG. 9 is a flowchart for explaining an example of processing in the automatic and manual setting mode in the defect inspecting system according to the present embodiment.

FIG. 9 is an example of the processing flow of the setting unit 166 when the determination parameter is automatically set based on a plurality of input images. The processing when the plurality of input images is used will be described with reference to FIG. 9, focusing on a difference from FIG. 7.

In this case, the setting unit 166 receives the designation of the defect region for all of the plurality of input images in S201.

Further, in S203, the setting unit 166 acquires the measurement result image of each of the plurality of input images from the determination unit 162. Then, a difference between the density inside the defect region and the density outside the defect region is calculated for each of the measurement result images, and a total value of the differences calculated for each of the input images is calculated as a score (S304). Other processing is the same as the flow of FIG. 7. Accuracy of the defect detection can be further improved by setting the determination parameters using a plurality of input images.

In this way, in the fully automatic mode, the user can automatically set appropriate determination parameters simply by identifying the region to be detected as a defect.

<4. User Interface Screen Example>

Next, some examples of the user interface screen provided by the defect inspecting device 100 according to the present embodiment and output to the display unit will be described with reference to FIGS. 10A to 10D.

Figure 10A:
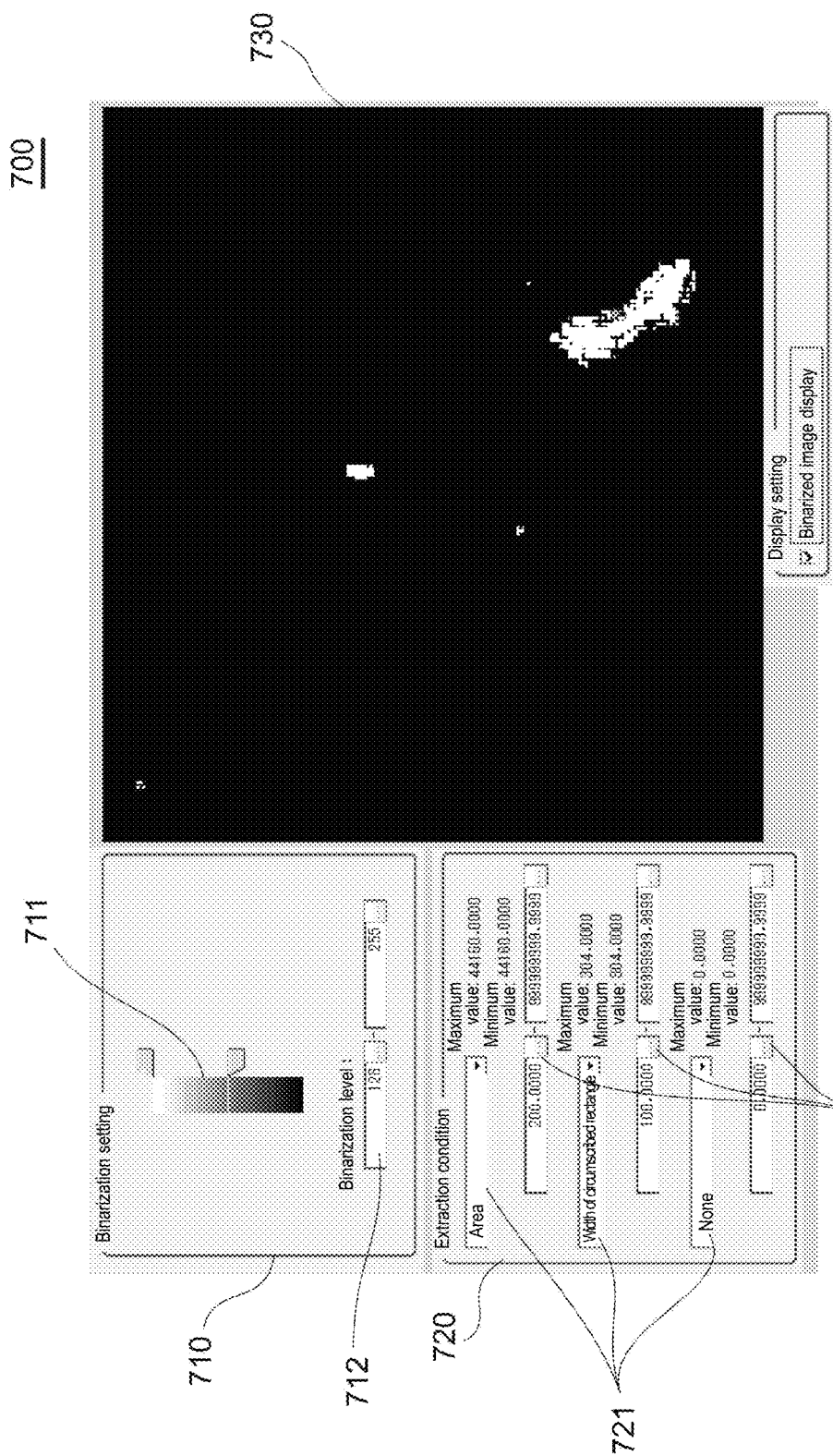
FIG. 10A is a schematic view showing an example of a user interface screen provided by the defect inspecting device according to the present embodiment.

FIG. 10A is a schematic view showing an example of a manual setting screen 700 provided by the defect inspecting device 100 when the determination parameters are set. The manual setting screen 700 has a binarization level setting unit 710, a determination condition setting unit 720, and a measurement result image display unit 730. The manual setting screen 700 is mainly used in the manual mode.

The binarization level setting unit 710 includes a binarization level controller 711 and a binarization level display field 712. The user can set the threshold value and the upper limit of the binarization level from the binarization level controller 711. The set binarization level is displayed in the binarization level display field 712.

The determination condition setting unit 720 includes a determination item selection field 721 and a determination threshold value setting field 722. The user can select the determination item to be designated as a determination condition from the determination item selection field 721, for example, by pulling down. In the example of FIG. 10A, there are three types of determination items which can be set, but the present disclosure is not limited thereto, and the manual setting screen 700 may have an interface which can set the arbitrary number of determination items. Further, the user can set the determination condition by setting the upper limit and the lower limit of the determination threshold value in the determination threshold setting field 722 of the corresponding determination item.

Further, the measurement result image display unit 730 displays the measurement result image generated by the determination unit 162 based on the set determination parameters.

Figure 10B:
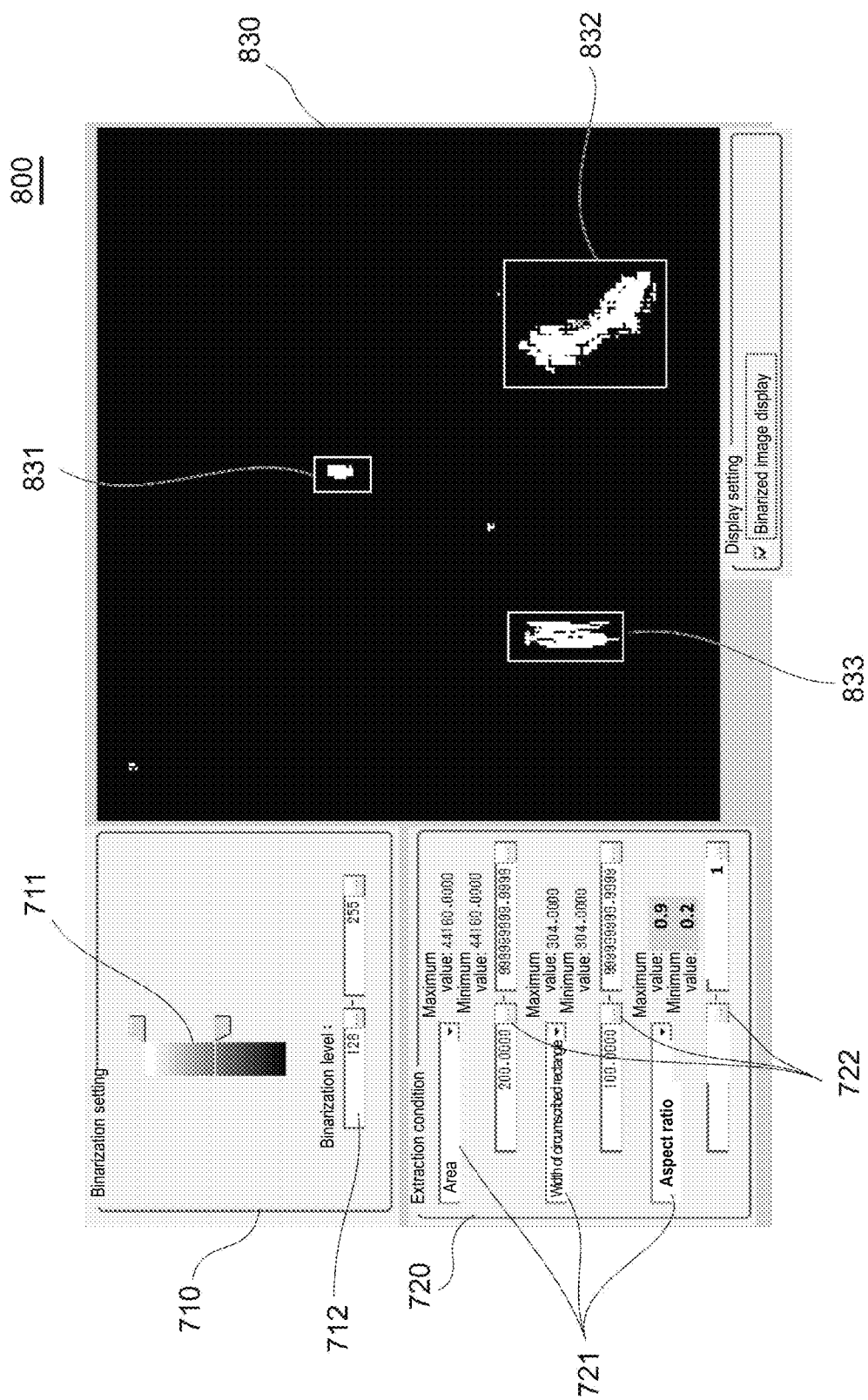
FIG. 10B is a schematic view showing an example of the user interface screen provided by the defect inspecting device according to the present embodiment.
Figure 10C:
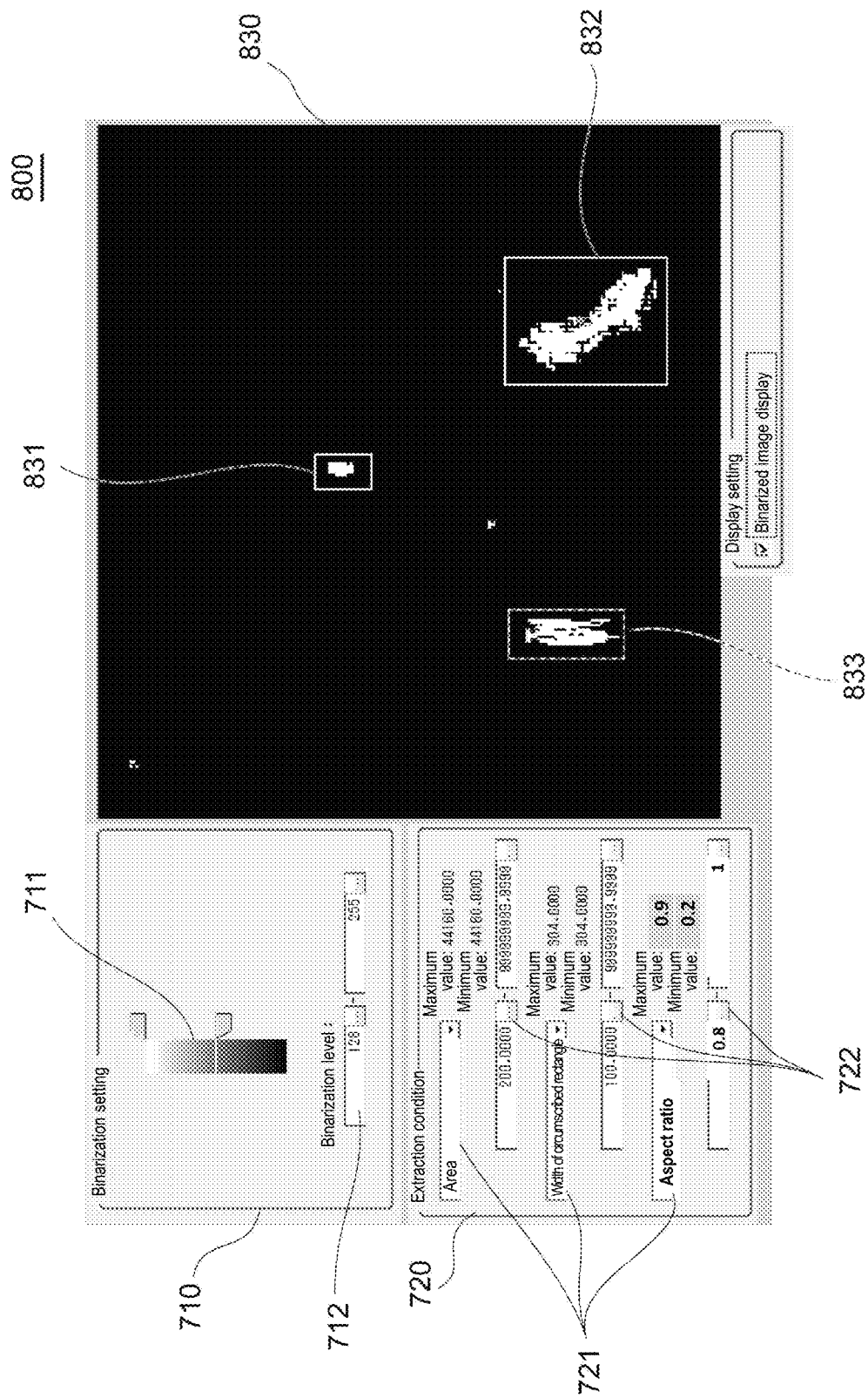
FIG. 10C is a schematic view showing an example of the user interface screen provided by the defect inspecting device according to the present embodiment.

FIGS. 10B and 10C are schematic views showing an example of a semi-automatic setting screen 800 provided by the defect inspecting device 100 when the determination parameters are set. The semi-automatic setting screen 800 includes a third feature region selection unit 830, and the above-described binarization level setting unit 710 and determination condition setting unit 720. The semi-automatic setting screen 800 is mainly used in the semi-automatic mode. The semi-automatic setting screen 800 may be used in the operation of identifying the defect region in the fully automatic mode when the defect region of the inspection image is identified in advance.

Functions of the binarization level setting unit 710 and the determination condition setting unit 720 are as described above, but on the semi-automatic setting screen 800, the determination parameters which are provisionally set are set and displayed in advance.

The setting image generated by the determination unit 162 based on the provisionally set determination parameters is displayed in the third feature region selection unit 830. In this setting image, the second feature region is highlighted by being surrounded by frames 831 to 833 (FIG. 10B). The user can select a region to be designated as the third feature region in the highlighted second feature region. FIG. 10C shows an example of a screen display when the second feature region surrounded by the frame 833 in FIG. 10B is selected as the third feature region. When the third feature region is selected, the determination parameters are updated, and the determination parameters displayed in the binarization level setting unit 710 or the determination condition setting unit 720 change. In the example of FIG. 10C, the lower limit of the aspect ratio of the determination item is changed from 0 (FIG. 10B) to 0.8 (FIG. 10C). At this time, not only the determination threshold value and the binarization level but also the determination items selected in the selected determination condition setting unit 720 may change.

Figure 10D:
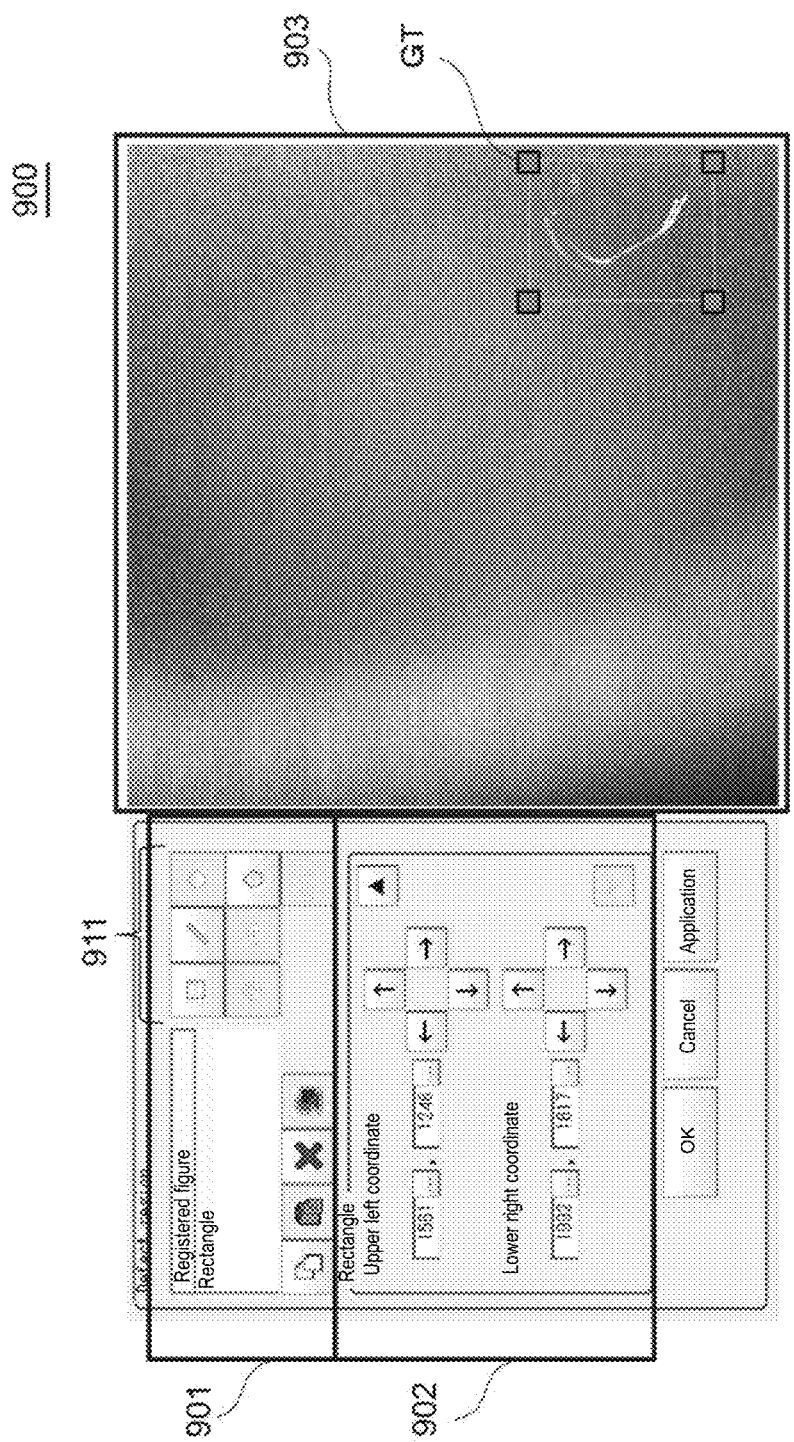
FIG. 10D is a schematic view showing an example of the user interface screen provided by the defect inspecting device according to the present embodiment.

FIG. 10D is a schematic view showing an example of an automatic setting screen 900 provided by the defect inspecting device 100 according to the present embodiment. In the example of FIG. 10D, the automatic setting screen 900 includes a figure registration region 901, a coordinate input region 902, and a display region 903.

The figure registration region 901 includes a figure button 911. The user can select a figure which identifies the defect region by selecting a button of a figure having a desired shape from the figure button 911. In the example of FIG. 10D, a square, a rectangle, a circle, a pentagon, an arc shape, and a concentric circle are displayed as the figure button 911, but the figure button 911 is not limited thereto, and any figure can be set. Further, a method of selecting a figure is not limited to the button, and may be a pull-down, a check box, a radio button, or the like.

The coordinate input region 902 receives an input of coordinates of the defect region. In the example of FIG. 10D, the user can designate the defect region GT by inputting the coordinates of an upper left portion and an upper right portion of the defect region in the coordinate input region 902. The defect region GT designated by the user is displayed in the display region 903.

A method of designating the defect region is not limited to the example of FIG. 10D. For example, the defect region may be input by drawing directly on an image displayed in the display region 903.

§ 3 Operation Example

Next, an operation example in the defect inspecting system 1 according to the present embodiment will be described. In the defect inspecting system 1 according to the present embodiment, there are a preparation step for setting the determination parameters related to the image measurement processing and an operation step for actually imaging a target workpiece and performing the image measurement processing. Processing sequence of the preparation step and processing sequence of the operation step can be selected by the user using the above-described input unit. In addition, in the processing sequence of the operation step, processing of updating the set pre-processing filter may be performed according to the content of the inspection results (for example, information such as the presence or absence of a defect, a size of a region corresponding to the defect, and a position of the region). For example, when an undetected defect is generated a predetermined number of times in the processing sequence of the operation step, the above-described determination parameters may be updated in any of the setting modes.

Figure 11:
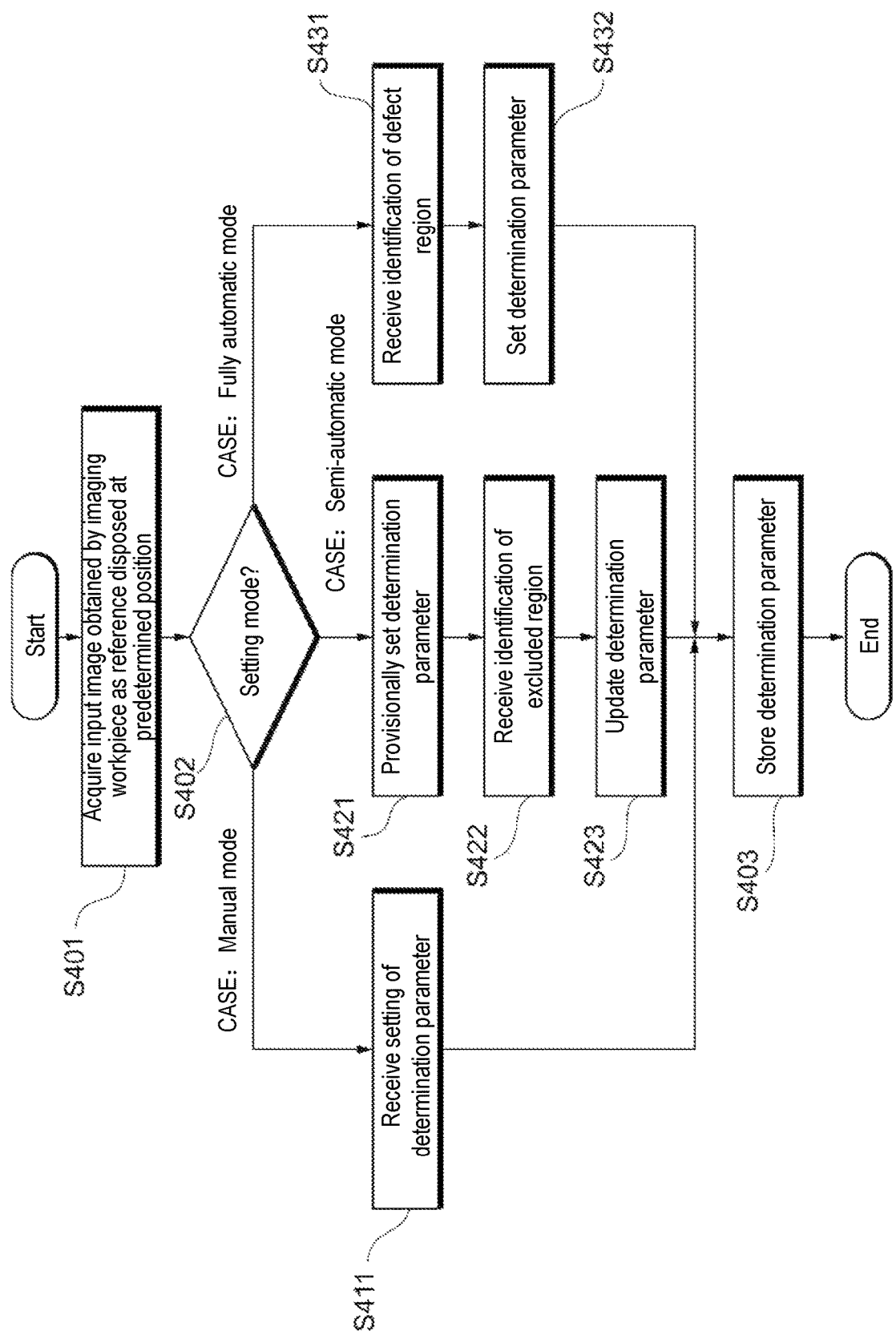
FIG. 11 is a flowchart showing a processing procedure of a preparation step in the defect inspecting system according to the present embodiment.
Figure 12:
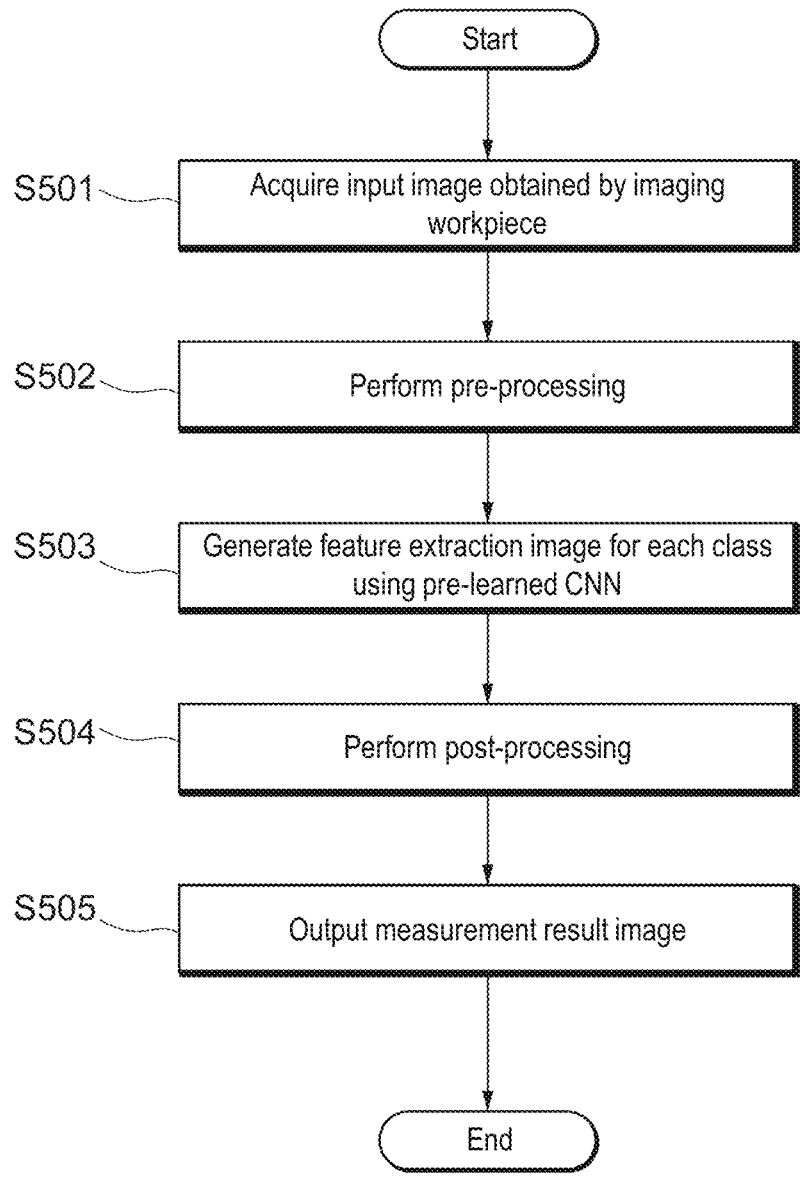
FIG. 12 is a flowchart showing a processing procedure of an operation step in the defect inspecting system according to the present embodiment.

FIG. 11 is a flowchart showing a processing procedure of the preparation step in the defect inspecting system 1 according to the present embodiment. FIG. 12 is a flowchart showing a processing procedure of the operation step in the defect inspecting system 1 according to the present embodiment. Each of steps of the processing procedure shown in FIGS. 11 and 12 is typically realized by the processor 110 of the defect inspecting device 100 executing an image processing program 132 or the like.

Referring to FIG. 11, in the preparation step, the defect inspecting device 100 acquires an input image obtained by capturing an image using the camera 102 with the workpiece as a reference for the image measurement processing disposed at a predetermined position (step S401). At this time, the input image (the image data) generated by the camera 102 capturing an image of the workpiece is transferred to the defect inspecting device 100 and expanded in the main memory 112 of the defect inspecting device 100.

Subsequently, the defect inspecting device 100 receives a selection of the setting mode (S402). When the setting mode is the manual mode (CASE: manual mode), the defect inspecting device 100 displays the manual setting screen 700 and receives setting of the determination parameters from the user (S411).

When the setting mode is the semi-automatic mode (CASE: semi-automatic mode), the defect inspecting device 100 first provisionally sets the determination parameters (S421). Next, the setting image is generated using the provisionally set determination parameters, and the user identifies the third feature region on the second feature region displayed on the setting image (S422). The defect inspecting device 100 updates the determination parameters based on the identified third feature region (S423).

Further, when the setting mode is the fully automatic mode (CASE: fully automatic mode), the defect inspecting device 100 displays the automatic setting screen 900 and receives the identification of the defect region from the user (S431). Then, the defect inspecting device 100 sets the determination parameters based on the identified defect region (S432).

Further, the defect inspecting device 100 stores the set determination parameters (S403). Then, the processing in the preparation step is completed.

Referring to FIG. 12, in the operation step, when the workpiece which serves as a reference for the image measurement processing reaches the imaging visual field 6 of the camera 102, the defect inspecting device 100 acquires the input image obtained by imaging the workpiece using the camera 102 (S501). At this time, the input image (the image data) generated by the camera 102 capturing an image of the workpiece is transferred to the defect inspecting device 100 and expanded in the main memory 112 of the defect inspecting device 100.

Subsequently, the defect inspecting device 100 performs the pre-processing on the acquired input image (S502). Further, the defect inspecting device 100 performs processing of extracting a feature for each of the types (the classes) of one or a plurality of features from the input image after the pre-processing using the pre-learned CNN. The defect inspecting device 100 generates a feature extraction image for each of one or a plurality of classes by the processing of extracting the feature (S503).

Subsequently, the defect inspecting device 100 performs the post-processing and generates the measurement result image (S504).

Finally, the defect inspecting device 100 outputs the generated measurement result image (S505). An output destination of the measurement result image may be the display 104 or the like, or may be the PLC 10 and/or the database device 12 connected via the host network 8. Then, the processing of the operation step is completed. The defect inspecting device 100 may output an inspection result including at least information on whether or not the inspection target includes a defect, instead of the measurement result image or together with the measurement result image. The inspection result is transmitted to, for example, a predetermined operating machine which sorts the inspection target on the production line. Accordingly, the operating machine can perform automatic sorting of the inspection target according to the inspection result.

A condition for starting the processing procedure of the operation step shown in FIG. 12 may be any one of a trigger signal from a timing sensor for detecting arrival of the workpiece, a performance start instruction from a host device, and an instruction from the user.

Figure 13:
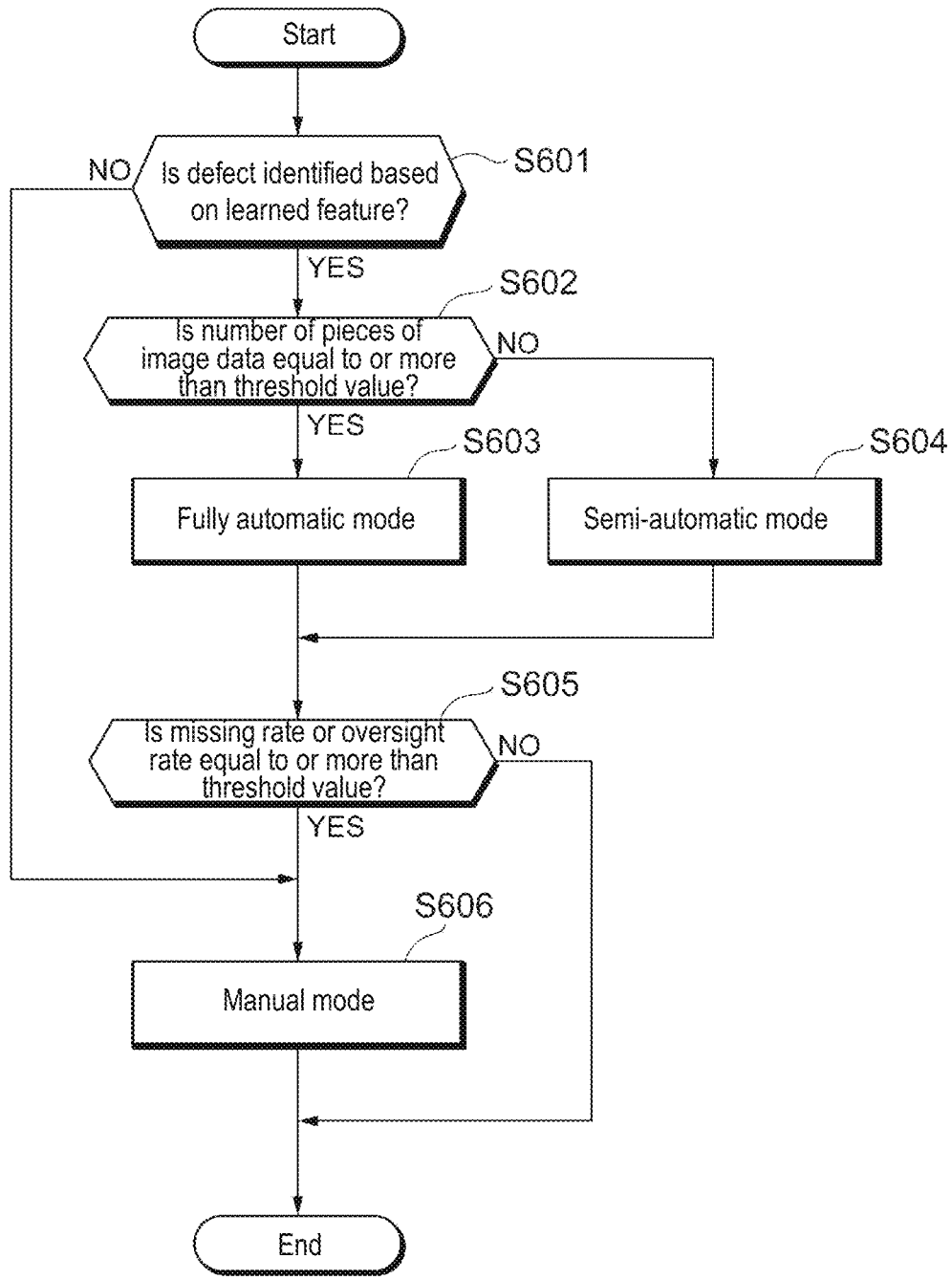
FIG. 13 is a flowchart showing an example of a flow of switching processing of a setting mode of determination parameters according to the present embodiment.

Next, switching of the determination parameter setting mode will be described with reference to FIG. 13. FIG. 13 is a flowchart showing an example of processing of switching the setting mode of the determination parameters according to the present embodiment.

In Step S601, the defect inspecting device 100 determines whether or not to identify the region corresponding to the defect based on the pre-learned features. Examples of the pre-learned features include features (for example, a shape, a size, the number, and the like) of defects (for example, "white dots", "black dots", "white lines", or "black lines").

In Step S602, the defect inspecting device 100 determines whether or not the number of pieces of image data for learning corresponding to the feature used for identifying the region corresponding to the defect is equal to or greater than a threshold value. This threshold value is set, for example, to a value which serves as a reference for determining whether or not the CNN engine 156 has sufficiently learned the features used for identifying the region corresponding to the defect.

In Step S603, the setting unit 166 sets the determination parameters in the fully automatic mode. In the fully automatic mode, the setting unit 166 automatically sets the determination parameters.

In Step S604, the setting unit 166 sets the determination parameters in the semi-automatic mode. In the semi-automatic mode, the setting unit 166 provisionally sets the determination parameters on the premise of a post-adjustment from the user.

In Step S605, the defect inspecting device 100 determines whether or not an oversight rate or a missing rate of defect detection based on the determination parameters set in Step S603 or Step S604 exceeds a predetermined threshold value.

In Step S606, the setting unit 166 sets the determination parameters in the manual mode. In the manual mode, the setting unit 166 sets the determination parameters according to the designation from the user.

Figure 14:
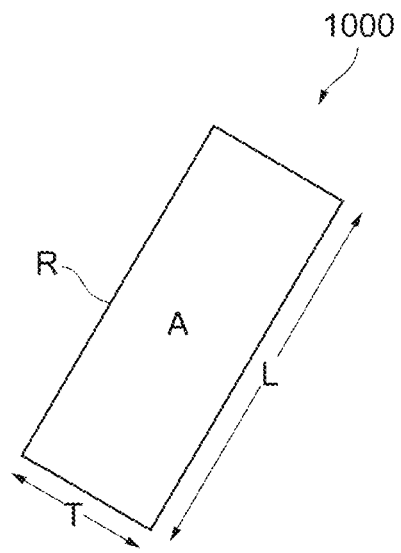
FIG. 14 is an explanatory view showing an example of pre-learned features according to the present embodiment.
Figure 15:
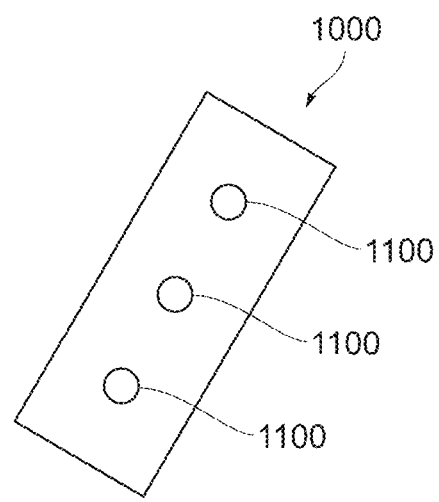
FIG. 15 is an explanatory view showing an example of features other than the pre-learned features according to the present embodiment.

Next, with reference to FIGS. 14 and 15, an example in which the region corresponding to the defect is identified based on a feature other than the pre-learned features will be described. FIG. 14 shows features of a rectangular defect 1000, and the CNN engine 156 learns in advance a shape, a length L, a width T, an area A, and a range of a perimeter R of the defect 1000. Therefore, the CNN engine 156 can extract features having the same features as those of the learned defect 1000 (for example, a shape, a length, a width, an area, and a perimeter) from the inspection image. On the other hand, for example, as shown in FIG. 15, when the CNN engine 156 has not pre-learned features (for example, a shape, a size, the number, and like) of holes 1100 formed in the defect 1000, it is not possible to identify the region corresponding to the defect based on the presence or absence of the holes 1100 and the number thereof. In this way, when the region corresponding to the defect is identified based on features other than the pre-learned features, preferably, the setting unit 166 sets the determination parameters according to the designation from the user in the manual mode.

<H. Advantages>

The defect inspecting device 100 according to the present embodiment can appropriately and easily set the determination parameters for determining the presence or absence of a defect when the presence or absence of the defect is inspected using the results output by the pre-learned classifier. In such a defect inspecting device 100, erroneous determination can be reduced by making it possible to appropriately set the determination parameters. In particular, since noise can be reduced, a false detection which recognizes that there is a defect even when there is not a defect is reduced. Furthermore, since the determination parameters can be easily set, man-hours for setting and starting up the defect inspecting device can be reduced.

Further, the defect inspecting device 100 according to the present embodiment facilitates the setting of the determination parameters for separating noise included in the feature extraction image output by the CNN engine having a plurality of pre-learned classes from the defect to be extracted. Specifically, the defect inspecting device 100 according to the present embodiment has a function (the semi-automatic mode) in which the user adjusts at least a preset threshold value. Accordingly, since the user only needs to adjust the threshold value when the preset threshold value is not appropriate, a load of setting the determination parameters can be reduced.

Further, the defect inspecting device 100 according to the present embodiment has the manual mode and the fully automatic mode in addition to the above-described semi-automatic mode as the mode for setting the determination parameters. For example, the operator can appropriately set the determination parameters simply by designating the defect region using the fully automatic mode for setting the determination parameters. As described above, since the defect inspecting device according to the present embodiment has a plurality of setting modes, it is possible to select an appropriate setting mode according to a proficiency level of the operator.

Although the embodiments of the present disclosure have been described in detail above, the above description is merely an example of the present disclosure in all respects. Needless to say, various improvements and modifications can be made without departing from the scope of the present disclosure. In addition, a part or all of the above-described embodiment may be described as in the following appendix, but is not limited to the following.

(Appendix 1)

A defect inspecting device (100) includes:

an acquisition unit (114) which acquires an inspection image of an inspection target, an image generating unit (156) which generates one or more feature extraction images by applying to the inspection image a learned classifier which has pre-learned by extracting one or more features using image data for learning, an inspection unit (170) which identifies a region corresponding to a defect based on one or more determination parameters for determining presence or absence of a detection target portion in the inspection target and a binarized image generated based on the feature extraction image, and a setting unit (166) which provisionally sets the determination parameters on premise of a post-adjustment from a user when a number of image data for learning corresponding to the features is less than a threshold value in a case where the region corresponding to the defect is identified based on the pre-learned features, and sets the determination parameters according to designation from the user in a case where the region corresponding to the defect is identified based on a feature other than the pre-learned features.

(Appendix 2)

In the defect inspecting device (100) described in Appendix 1, the setting unit (166) automatically sets the determination parameters when the number of image data for learning corresponding to the features is equal to or greater than the threshold value in the case where the region corresponding to the defect is identified based on the pre-learned features.

(Appendix 3)

In the defect inspecting device (100) described in Appendix 1 or 2, the setting unit (166) calculates an image score based on a color density of pixels of a setting image using the setting image which is the binarized image in which the region corresponding to the defect has been identified, and updates the determination parameters so that a difference between the image score inside the region and the image score outside the region becomes relatively large.

(Appendix 4)

In the defect inspecting device (100) described in Appendix 3, the binarized image is configured of white pixels and black pixels, a density value is associated with each of the white pixel and the black pixel, and the setting unit (166) calculates a total value of color density values of a plurality of pixels included in the region as a first image score, calculates a total value of color density values of a plurality of pixels included outside the region as a second image score, and updates the determination parameters so that a difference between the first image score and the second image score is maximized.

(Appendix 5)

In the defect inspecting device (100) described in Appendix 3 or 4, the inspection unit (170) determines the presence or absence of the defect based on the updated determination parameters and the binarized image, and outputs then determination results thereof.

(Appendix 6)

In the defect inspecting device (100) described in Appendix 5, the inspection unit (170) outputs at least the binarized image in which the defect has been identified based on the updated determination parameters as the determination results.

(Appendix 7)

In the defect inspecting device (100) described in any one of Appendices 1 to 6, the determination parameters include a binarization level for generating the binarized image.

(Appendix 8)

In the defect inspecting device (100) described in any one of Appendices 1 to 7, the determination parameters include one or more determination items for determining the defect and a determination threshold value set for each of the determination items.

(Appendix 9)

In the defect inspecting device (100) described in Appendix 8, the one or more determination items for determining the defect include at least one of an area, a width and/or a height of a circumscribed rectangle, a perimeter, an aspect ratio, and a circularity of a predetermined region represented by a block of pixels of a same color in the binarized image, and the determination threshold value includes an upper limit value and/or a lower limit value set for each of the determination items.

(Appendix 10)

In the defect inspecting device (100) described in Appendix 8 or 9, the determination item and the determination threshold value are determined based on a feature amount of the defect contained in the image data for learning used in learning of the image generating unit or the inspection unit.

(Appendix 11)

The defect inspecting device (100) described in any one of Appendices 1 to 10 further includes a display unit (104) which receives designation of the region is further provided, and the inspection unit (170) identifies a region determined as a defect based on the predetermined determination parameters, and outputs the identified region together with the inspection image to the display unit (104), and the setting unit (166) generates the setting image based on the designation of the region received through the display unit.

(Appendix 12)

In the defect inspecting device (100) described in any one of claims Appendices 1 to 11, in the binarized image, the inspection unit (170) identifies a region determined as a defect in the binarized image based on a determination threshold value set for each of one or more feature amounts for determining the defect, and prompts the identified region to the user, and the setting unit (166) receives from the user designation of a region which is determined as the defect by the inspection unit (170) but should not be determined as the defect, and/or a region which is not determined as a defect by the inspection unit but should be determined as the defect, and updates the determination threshold value based on the designation.

(Appendix 13)

In the defect inspecting device (100) described in Appendix 12, the determination parameters include one or more determination items for determining the defect and the determination threshold value set for each of the determination items, and the one or more determination items for determining the defect and the determination threshold value are determined based on the designation of the user.

(Appendix 14)

A defect inspecting method including the following steps executed by a computer (100):

a step of acquiring an inspection image of an inspection target;

a step of generating one or more feature extraction images by applying to the inspection image a learned classifier which has pre-learned by extracting one or more features using image data for learning;

a step of identifying a region corresponding to a defect based on one or more determination parameters for determining presence or absence of a detection target portion in the inspection target and a binarized image generated based on the feature extraction image; and a step of provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features.

(Appendix 15)

A program which causes a computer (100) to execute the following steps, a step of acquiring an inspection image of an inspection target;

a step of generating one or more feature extraction images by applying to the inspection image a learned classifier which has pre-learned by extracting one or more features using image data for learning;

a step of identifying a region corresponding to a defect based on one or more determination parameters for determining presence or absence of a detection target portion in the inspection target and a binarized image generated based on the feature extraction image; and a step of provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features.

The invention claimed is:

1. A defect inspecting device comprising:
a processor, configured to:
acquire an inspection image of an inspection target;
generate one or more feature extraction images by applying to the inspection image a learned classifier which has pre-learned by extracting one or more features using image data for learning;
identify a region corresponding to a defect based on one or more determination parameters for determining presence or absence of a defect in the inspection target and a binarized image generated based on the feature extraction image; and
provisionally set the determination parameters on premise of a post-adjustment from a user when a number of image data for learning corresponding to the features is less than a threshold value in a case where the region corresponding to the defect is identified based on the pre-learned features, and to set the determination parameters according to designation from the user in a case where the region corresponding to the defect is identified based on a feature other than the pre-learned features.

2. The defect inspecting device according to claim 1, wherein the processor automatically sets the determination parameters when the number of image data for learning corresponding to the features is equal to or greater than the threshold value in the case where the region corresponding to the defect is identified based on the pre-learned features.

3. The defect inspecting device according to claim 1, wherein the processor calculates an image score based on a color density of pixels of a setting image using the setting image which is the binarized image in which the region corresponding to the defect has been identified, and updates the determination parameters so that a difference between the image score inside the region and the image score outside the region becomes relatively large.

4. The defect inspecting device according to claim 3, wherein:
the binarized image is configured of white pixels and black pixels,
a density value is associated with each of the white pixels and the black pixels, and
the processor calculates a total value of the density values of a plurality of pixels included in the region as a first image score, calculates a total value of the density values of a plurality of pixels included outside the region as a second image score, and updates the determination parameters so that a difference between the first image score and the second image score is maximized.

5. The defect inspecting device according to claim 3, wherein the processor determines the presence or absence of a defect based on the updated determination parameters and the binarized image, and then outputs determination results thereof.

6. The defect inspecting device according to claim 5, wherein the processor outputs at least the binarized image in which the defect has been identified based on the updated determination parameters as the determination results.

7. The defect inspecting device according to claim 1, wherein the determination parameters comprise a binarization level for generating the binarized image.

8. The defect inspecting device according to claim 1, wherein the determination parameters comprise one or more determination items for determining the defect and a determination threshold value set for each of the determination items.

9. The defect inspecting device according to claim 8, wherein the one or more determination items for determining the defect comprise at least one of an area, a width and/or a height of a circumscribed rectangle, a perimeter, an aspect ratio, and a circularity of a predetermined region represented by a block of pixels of a same color in the binarized image, and the determination threshold value comprises an upper limit value and/or a lower limit value set for each of the determination items.

10. The defect inspecting device according to claim 8, wherein the determination item and the determination threshold value are determined based on a feature the defect contained in the image data for learning used in learning of the processor.

11. The defect inspecting device according to claim 3, further comprising a display configured to receive designation of the region,
wherein the processor identifies a region determined as a defect based on the predetermined determination parameters, and outputs the identified region together with the inspection image to the display, and
the processor generates the setting image based on the designation of the region received through the display.

12. The defect inspecting device according to claim 1, wherein:
in the binarized image, the processor identifies a region determined as a defect in the binarized image based on a determination threshold value set for each of one or more feature amounts for determining the defect, and prompts the identified region to the user; and
the processor receives from the user designation of a region which is determined as a defect by the processor but should not be determined as a defect, and/or a region which is not determined as a defect by the processor but should be determined as a defect, and updates the determination threshold value based on the designation.

13. The defect inspecting device according to claim 12, wherein:
the determination parameters comprise one or more determination items for determining the defect and the determination threshold value set for each of the determination items, and
the one or more determination items for determining the defect and the determination threshold value are determined based on the designation of the user.

14. A defect inspecting method comprising the following steps executed by a computer:
acquiring an inspection image of an inspection target;
generating one or more feature extraction images by applying to the inspection image a learned classifier which has pre-learned by extracting one or more features using image data for learning;
identifying a region corresponding to a defect based on one or more determination parameters for determining presence or absence of a detection target portion in the inspection target and a binarized image generated based on the feature extraction image; and
provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features.

15. A non-transitory computer readable storage medium, storing a program which causes a computer to execute the following steps:
acquiring an inspection image of an inspection target;
generating one or more feature extraction images by applying to the inspection image a learned classifier which has pre-learned by extracting one or more features using image data for learning;
identifying a region corresponding to a defect based on one or more determination parameters for determining presence or absence of a detection target portion in the inspection target and a binarized image generated based on the feature extraction image; and
provisionally setting the determination parameters on premise of a post-adjustment from a user when a number of image data for learning corresponding to the features is less than a threshold value in a case where the region corresponding to the defect is identified based on the pre-learned features, and setting the determination parameters according to designation from the user in a case where the region corresponding to the defect is identified based on a feature other than the pre-learned features.

* * * * *